United States Patent
Chau et al.

(10) Patent No.: US 8,428,873 B2
(45) Date of Patent: Apr. 23, 2013

(54) PANORAMIC IMAGES WITHIN DRIVING DIRECTIONS

(75) Inventors: Stephen Chau, Stanford, CA (US); Stephane Lafon, Sunnyvale, CA (US); Jie Shao, Sunnyvale, CA (US); Andrew Timothy Szybalski, San Francisco, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 606 days.

(21) Appl. No.: 12/410,033

(22) Filed: Mar. 24, 2009

(65) Prior Publication Data

US 2009/0240431 A1 Sep. 24, 2009

Related U.S. Application Data

(60) Provisional application No. 61/038,966, filed on Mar. 24, 2008, provisional application No. 61/048,489, filed on Apr. 28, 2008.

(51) Int. Cl.
*G01C 21/30* (2006.01)

(52) U.S. Cl.
USPC ............ 701/436; 701/400; 701/409; 701/431

(58) Field of Classification Search .......... 701/200–226, 701/400–541
See application file for complete search history.

(56) References Cited

U.S. PATENT DOCUMENTS

| | | | |
|---|---|---|---|
| 2004/0220729 A1* | 11/2004 | Park et al. ..................... | 701/209 |
| 2005/0270311 A1 | 12/2005 | Rasmussen et al. | |
| 2005/0273718 A1* | 12/2005 | Naas ............................. | 715/745 |
| 2006/0004512 A1* | 1/2006 | Herbst et al. ................. | 701/208 |
| 2007/0016368 A1 | 1/2007 | Chapin et al. | |
| 2008/0167811 A1* | 7/2008 | Geelen ......................... | 701/212 |

FOREIGN PATENT DOCUMENTS

| | | |
|---|---|---|
| EP | 1 614 997 A1 | 1/2006 |
| WO | WO 2007/042846 A1 | 4/2007 |

OTHER PUBLICATIONS

"Navigation Innovation Arrives in Style with the NAVIGON 7100; Sleek, ultra-thin portable navigation device boasts unmatched functionality." PR Newswire. New York. Jul. 12, 2007. Retrieved via ProQuest on Dec. 16, 2012.*
Kimber et al. "Flyabout: Spatially Indexed Panoramic Video," *Proc. ACM Multimedia 2001*, Ottawa, CA, Oct. 2001, 10 pgs.
Lippman, Andrew. "Movie-Maps: An Application of the Optical Videodisc to Computer Graphics," ACM SIGGRAPH Computer Graphics, 14:3, 1980, pp. 32-42.
Chen, Shenchang Eric. "QuickTime VR—An Image-Based Approach to Virtual Environment Navigation," Proceedings of the 22nd Annual Conference on Computer Graphics and Interactive Techniques, 1995, pp. 29-38.

(Continued)

*Primary Examiner* — Michael Misiaszek
(74) *Attorney, Agent, or Firm* — McDermott Will & Emery LLP

(57) ABSTRACT

Embodiments of the present invention enable displaying a plurality of driving direction steps that form a driving directions path between a start address and a destination address; receiving input selecting a driving direction step of said plurality of driving direction steps; and displaying a panoramic image of a geographic area where a driving action associated with said selected driving direction step would be performed by a driver. In other embodiments, the panoramic image is replaced and/or complemented with one or more of 3D models, full-motion video, full-motion video of 360 degrees images, and live feeds from video cameras to provide enhanced driving directions.

51 Claims, 20 Drawing Sheets

OTHER PUBLICATIONS

Endo et al. "Image-Based Walk-Through System for Large-Scale Scenes," 4th International Conference on Virtual Systems and MultiMedia, 1998, 6 pgs.

Hart, John C. "On Recording Virtual Environments," Virtual Reality, 1993. Proceedings., IEEE 1993 Symposium on Research Frontiers, vol. 25-26, Oct 1993, pp. 80-83.

Hirose, Michitaka. "Image-Based Virtual World Generation," *IEEE MultiMedia*, 4:1, Jan.-Mar. 1997, pp. 27-33.

Hirose et al. "Generation of Wide-Range Virtual Spaces Using Photographic Images," Virtual Reality Annual International Symposium, 1998, 8 pgs.

Ishiguro, Hiroshi and Mohan Trivedi. "Integrating a Perceptual Information Infrastructure with Robotic Avatars: A Framework for Tele-Existence," IEEE/RSJ Intelligent Robotic Systems Conference, Korea, Oct. 1999, 7 pgs.

Ishiguro et al. "A Strategy for Acquiring an Environmental Model with Panoramic Sensing by a Mobile Robot," Robotics and Automation, IEEE International Conference, May 8-13, 1994, pp. 724-729.

Kawasaki et al. "Spatio-Temporal Analysis of Omni Image," Computer Vision and Pattern Recognition, 2000. Proceedings. IEEE Conference, 2000, vol. 2, pp. 577-584.

Kourogi et al. "A Panorama-Based Technique for Annotation Overlay and its Real-Time Implementation," IEEE International Conference on Multimedia and Expo (II), 2000, pp. 657-660.

Taylor, Camillo J. "VideoPlus: A Method for Capturing the Structure and Appearance of Immersive Environments," Visualization and Computer Graphics, IEEE Transactions, vol. 8:2, Apr.-Jun. 2002, pp. 171-182.

Zheng, Jiang Yu and Saburo Tsuji. "Panoramic Representation of Scenes for Route Understanding," Pattern Recognition, vol. 1, Jun. 1990, pp. 161-167.

International Search Report and Written Opinion, App. No. PCT/US2009/001817, mailed Jul. 7, 2009, 13 pgs.

* cited by examiner

PANORAMIC IMAGES WITHIN DRIVING DIRECTIONS

CROSS-REFERENCE TO RELATED APPLICATIONS

The present application claims priority to U.S. Provisional Patent Application No. 61/038,966, filed Mar. 24, 2008, and U.S. Provisional Patent Application No. 61/048,489, filed Apr. 28, 2008, both of which are herein incorporated by reference in their entireties.

BACKGROUND

1, Field of the Invention

The present invention relates generally to the display of map information, including driving directions.

2, Background Art

Applications that provide driving directions have gained significant prominence in the last few years.

Text-based driving directions applications provide driving directions aided with text description of driving steps. This text description has been limited to a narrative text description of a driving step, such as a driving command followed by a location and distance. For example, a text description might recite "turn right at Fifth Avenue 0.2 miles."

Enhanced driving directions applications are therefore needed.

BRIEF SUMMARY

Embodiments of the present invention relate generally to the display of map information, including driving directions, and more particularly to the display and/or navigation of images within driving directions.

Embodiments of the present invention enable displaying a plurality of driving direction steps that form a driving directions path between a start address and a destination address; receiving input selecting a driving direction step of said plurality of driving direction steps; and displaying a panoramic image of a geographic area where a driving action associated with said selected driving direction step would be performed by a driver. In other embodiments, the panoramic image is replaced and/or complemented with one or more of 3D models, full-motion video, full-motion video of 360 degrees images, and live feeds from video cameras to provide enhanced driving directions.

Embodiments of the present invention further enable navigation of panoramic images associated with the driving direction steps and/or other panoramic images not associated with or unrelated to the driving direction steps.

Embodiments of the present invention include several variations for displaying panoramic images, including displaying thumbnail images when a user hovers over the driving directions path.

Embodiments of the present invention may be implemented using hardware, software or a combination thereof and may be implemented in one or more computer systems or other processing systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements.

The present invention is described with reference to the accompanying drawings. The drawing in which an element first appears is typically indicated by the leftmost digit or digits in the corresponding reference number.

DETAILED DESCRIPTION

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments of the present invention relate generally to the display of map information, including driving directions, and more particularly to the display and/or navigation of images within driving directions.

Embodiments of the present invention enable displaying a plurality of driving direction steps that form a driving directions path between a start address and a destination address; receiving input selecting a driving direction step of said plurality of driving direction steps; and displaying a panoramic image of a geographic area where a driving action associated with said selected driving direction step would be performed by a driver. In other embodiments, the panoramic image is replaced and/or complemented with one or more of 3D models, fill-motion video, full-motion video of 360 degrees images, and live feeds from video cameras to provide enhanced driving directions.

Embodiments of the present invention further enable navigation of panoramic images associated with the driving direction steps and/or other panoramic images not associated with or unrelated to the driving direction steps.

Embodiments of the present invention include several variations for displaying panoramic images, including displaying thumbnail images when a user hovers over the driving directions path.

Embodiments of the present invention may be implemented using hardware, software or a combination thereof and may be implemented in one or more computer systems or other processing systems.

Further embodiments, features, and advantages of embodiments of the present invention, as well as the structure and operation of the various embodiments of the present invention, are described in detail below with reference to the accompanying drawings.

Introduction

Applications that provide driving directions have gained significant prominence in the last few years. Such applications can include, but are not limited to, stand-alone applications or applications that are provided as part of a web service.

Figure 1:
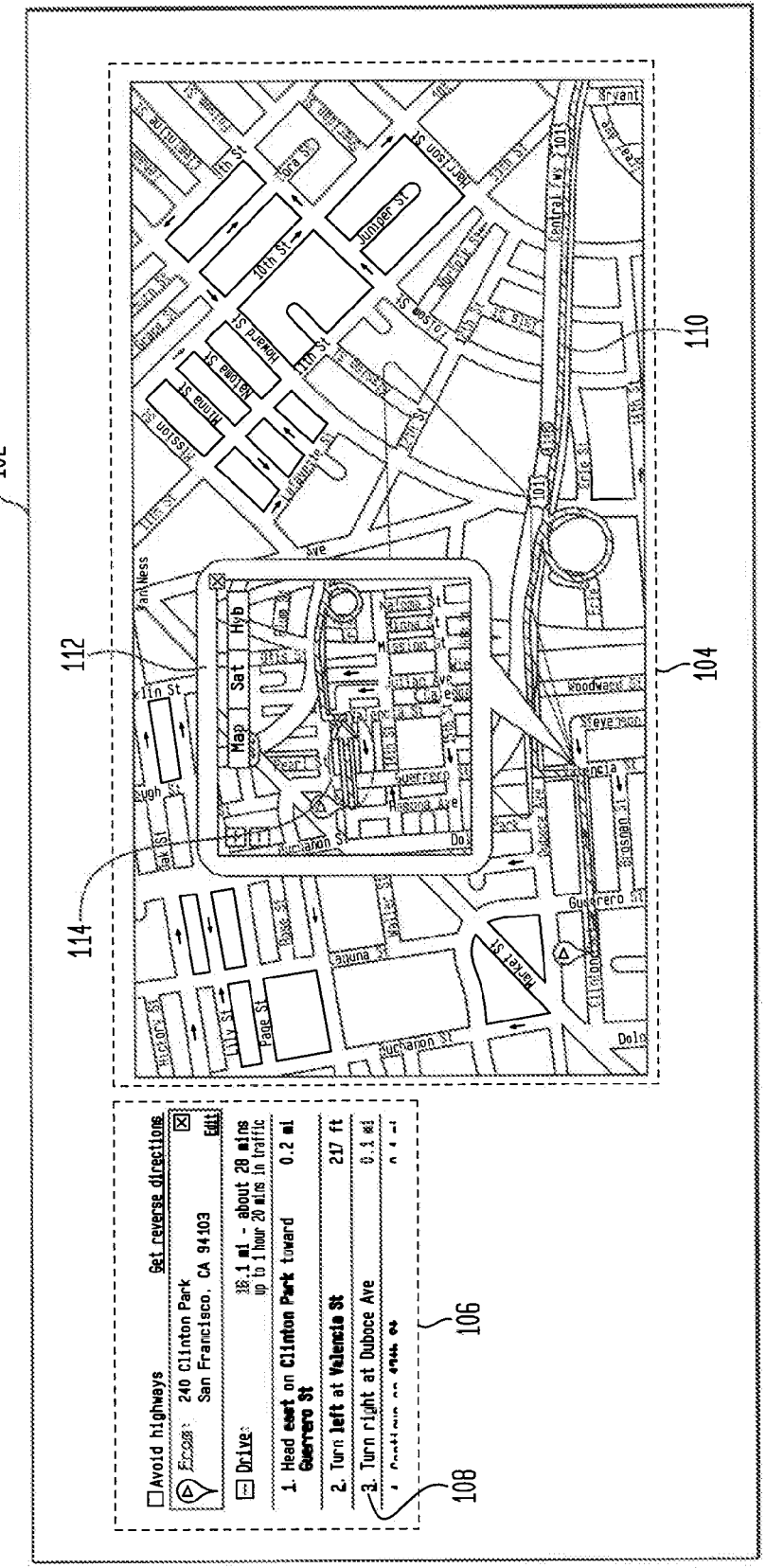
FIG. 1 is an example view of a driving directions application user interface.

FIG. 1 is an example view 100 of a user interface 102 of a driving directions application. User interface 102 can be provided within a browser, for example.

Generally, prior to displaying example view 100 of user interface 102, the driving directions application provides a user with the ability to input a start address from which and a destination address to which driving directions are desired. Processing of the user input generates driving directions from the start address to the destination address.

As shown in example view 100, the driver directions application presents the generated driving directions using a map view 104 and a driving directions panel 106.

Map view 104 includes a road map of the geographic area that encompasses the generated driving directions. The generated driving directions are illustrated within map view 104 using a driving directions path 110, which is a graphical illustration of the generated driving directions. Typically, driving directions path 110 is shown highlighted in a manner visually apparent to the user. For example, driving directions path 110 may be shown in blue color. Various features may also be provided within map view 104, including selecting, zooming, scrolling, etc.

Driving directions panel 106 includes a step-by-step description of the generated driving directions. As such, driving directions panel 106 includes a plurality of driving direction steps, beginning at the start address and ending at the destination address. Each of the plurality of driving direction steps, as shown for example with respect to driving direction step 108, includes a step number and a text description. The text description describes the driving action associated with the driving direction step.

In an embodiment, map view 104 and driving directions panel 106 are linked to each other, with each driving direction step within panel 106 corresponding to a portion of driving directions path 110 of map view 104. Accordingly, when the user selects a driving direction step from panel 106, a corresponding portion of path 110 is highlighted, illustrating the driving action associated with the selected driving direction step. In an embodiment, this includes highlighting the portion of path 110 that corresponds to the selected driving direction step differently than the rest of driving directions path 110. In another embodiment, selecting the highlighted portion of path 110 displays a zoom bubble, as illustrated by zoom bubble 112 in FIG. 1. The zoom bubble includes a zoomed-in view of the map area encompassing the selected driving direction step, with the selected driving direction step shown centrally within the zoom bubble. An arrow that further highlights the selected driving direction step may also be shown, as illustrated by arrow 114 in FIG. 1.

Driving Directions with Panoramic Images

According to a feature, a panoramic image may be displayed for a geographic area associated with a particular driving direction step. In the following, the display of a panoramic image associated with a driving direction step will be described with respect to an example display view in FIG. 2. Next, further navigation features will be described with respect to example display views in FIGS. 3-5. Finally, an example distributed system and method for implementing display of and/or navigation within a panoramic image associated with a driving direction step will be described with reference to FIGS. 6-8.

Figure 2:
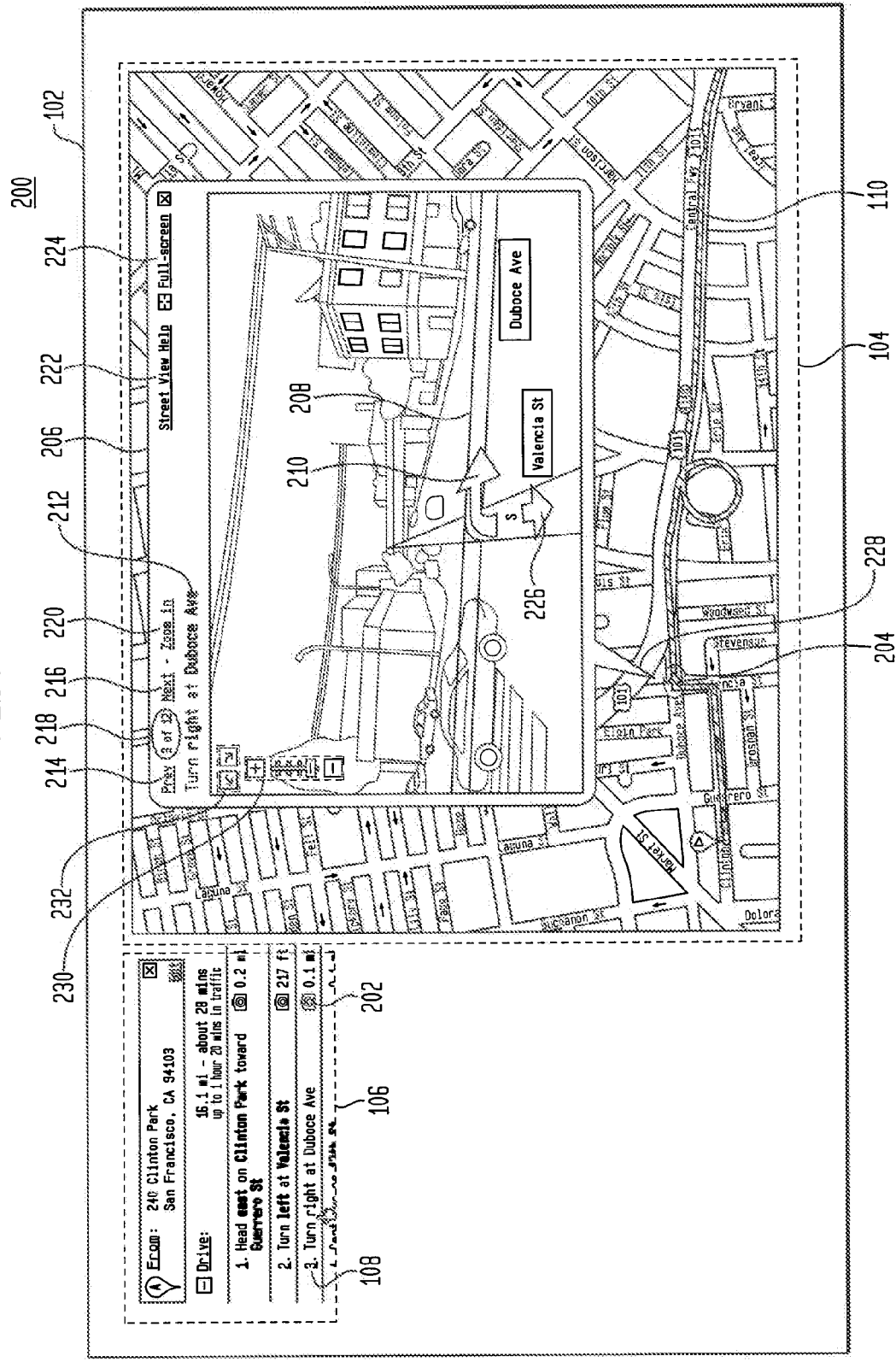
FIG. 2 is an example view of a driving directions application user interface, which illustrates panoramic driving directions according to an embodiment of the present invention.

FIG. 2 is an example view 200 of user interface 102. Example view 200 illustrates panoramic driving directions according to an embodiment of the present invention and is generated with a panoramic images feature enabled. The panoramic images feature will be referred to herein as panoramic view. Such a panoramic view can include a view of a panoramic image as provided, for example, in the view in the Google Maps service available from Google, Inc.

As shown in example view 200, user interface 102 presents driving directions using map view 104 and driving directions panel 106. Map view 104 and driving directions panel 106 are as described above with respect to FIG. 1. Additionally, however, when panoramic view is enabled, map view 104 and driving directions panel 106 include panoramic view features.

For example, in an embodiment, each driving direction step within driving directions panel 106 may have a visual indicator such as a camera icon 202 associated with it. The visual indicator indicates the availability of one or more panoramic images or panoramic view coverage of the driving action (i.e., latitude/longitude of the driving action) associated with the driving direction step. In example view 200, driving direction step 108 has camera icon 202 associated with it. When no panoramic view coverage is available, no visual indicator appears next to the driving direction step. Visual indicators, other than a camera icon, may also be used.

According to an embodiment of the present invention, selecting or hovering over camera icon 202 or a driving direction arrow 204 associated with driving direction step 108 pans map view 104, if needed (e.g., to position the relevant portion of driving directions path 110, such as driving direction arrow 204, within map view 104), and opens a panoramic image or panoramic view bubble 206. According to another embodiment of the present invention, panoramic view bubble 206 can be opened by selecting anywhere on driving direction step 108 in panel 106. Panoramic view bubble 206 has a tail 228 that points to driving direction arrow 204.

As shown in example view 200, panoramic view bubble 206 includes a panoramic image (360 degrees panoramic image in certain embodiments) of the actual geographic area where the driving action associated with driving direction step 108 would be performed by a driver. For example, panoramic view bubble 206 shows a panoramic image of the intersection of "Duboce Ave" and "Valencia St," where driving direction step 108, which includes turning right at "Duboce Ave" from "Valencia St," would be performed. Further, the panoramic image will be shown in an appropriate orientation relative to the path that the driver would be traveling according to the driving directions before reaching the driving direction step shown by the panoramic image. In other words, this includes orienting the image such that it shows the geographic area from a similar viewpoint as that of a driver performing the driving action.

According to an embodiment of the present invention, panoramic view bubble 206 further includes a driving direction overlay 208, which corresponds to a portion of driving directions path 110 associated with driving direction step 108.

According to another embodiment of the present invention, panoramic view bubble 206 further includes panoramic navigation controls, including a navigation control 210 which indicates the driving action shown by panoramic view bubble 206. Other panoramic navigation controls (e.g., panoramic navigation control 226) may also be shown in panoramic view bubble 206 according to embodiments of the present invention. For example, in an embodiment, only navigation controls that correspond to driving actions associated with the generated driving directions are shown. In another embodiment, panoramic navigation controls that are unrelated to the generated driving directions are also shown. For example, in example view 200, a panoramic navigation control that indicates a left turn on "Duboce Ave" may be shown, which is unrelated to the generated driving directions.

Panoramic View Navigation

According to an embodiment of the present invention, panoramic view navigation can be performed by using panoramic navigation controls that appear within panoramic view bubble 206. For example, referring to example view 200, selecting panoramic navigation control 210 simulates the driving action associated with control 210. In an embodiment, this includes navigating forward one panoramic image in the direction indicated by panoramic navigation control 210, when panoramic view imagery is available for the area directly adjacent, in the direction of panoramic navigation control 210, to the area currently shown by panoramic view bubble 206. In example view 200, this corresponds to navigating forward one panoramic image from the currently shown panoramic image such that a user would be looking East on "Duboce Ave," past the intersection of "Valencia St" and "Duboce Ave." On the other hand, when no panoramic view imagery is available for the area directly adjacent to the currently shown area in the direction of a panoramic navigation control, selecting the panoramic navigation control still includes re-orienting the panoramic image. For example, in example view 200, selecting panoramic navigation control 210, when no panoramic view imagery is available, results in a 90 degrees clockwise rotation within the panoramic image such that the intersection of "Valencia St" and "Duboce Ave" is displayed from a West vantage point.

According to embodiments of the present invention, navigating forward one panoramic image using panoramic navigation control 210 may correspond to displaying a panoramic image associated with the next driving direction step in panel 106. This occurs when the selected driving direction step and the next driving direction step correspond to directly consecutive panoramic images.

Alternatively, navigating forward one panoramic image may correspond to displaying a panoramic image that occurs between the selected driving direction step and the next driving direction step, but not associated with a driving direction step in panel 106.

Panoramic view navigation can also be performed by selecting panoramic navigation controls other than the one associated with the driving action being shown. For example, in example view 200, a user can select panoramic navigation control 226 to navigate one panoramic image back when panoramic view imagery is available. Also, when panoramic navigation controls unrelated to the generated driving directions are available, panoramic view navigation is also possible using those controls, allowing the user to navigate to other geographic areas not covered by the driving directions path outlined by the generated driving directions. According to an embodiment of the present invention, display of panoramic navigation controls unrelated to the generated driving directions is a feature selectable by the user.

According to an embodiment of the present invention, the driving direction overlay (e.g., driving direction overlay 208) and the panoramic navigation controls (e.g., panoramic navigation controls 210 and 226) are automatically overlaid on the panoramic image whenever a user opens a panoramic view bubble (e.g., panoramic view bubble 206) or navigates from one panoramic image to another within the panoramic view bubble. Alternatively, one or more of these features (i.e., driving direction overlay, panoramic navigation controls) can be disabled by the user.

According to another embodiment of the present invention, panoramic view navigation as described above can be performed by selecting driving direction controls (e.g., driving direction arrow 204) wherever shown on driving directions path 110 in map view 104. For example, selecting driving direction arrow 204 opens panoramic view bubble 206, as shown in example view 200. Selecting a consecutive driving direction arrow along driving directions path 110, when available, navigates to the panoramic image associated with the next driving direction step. Similarly, panoramic view navigation can be performed by selecting driving direction steps within driving directions panel 106.

It is noted that navigation by selecting the driving direction arrows on map view 104 and/or their associated driving direction steps in panel 106 only enables viewing of panoramic images associated with those steps. In certain instances, however, panoramic view imagery may be available for the distance between driving direction steps in panel 106. When available, panoramic view navigation of this imagery is possible using the panoramic navigation controls within panoramic view bubble 206.

Additional Panoramic View Features

Additional panoramic view features according to embodiments of the present invention will now be described.

In an embodiment, a panoramic view bubble includes further features, in addition to the features described above. For example, referring to panoramic view bubble 206, the panoramic view bubble may include one or more of a driving direction text description 212, a previous driving direction link 214, a next driving direction link 216, a driving direction step number 218, a zoom in link 220, a panoramic view help link 222, and a full-screen link 224.

Driving direction text description 212 describes the driving action shown within the panoramic view bubble. Accordingly, driving direction text description 212 changes as the user navigates from one driving direction step to another to reflect the currently selected driving direction step. In an embodiment, driving direction text description 212 is identical to the text description of the associated driving direction step in driving directions panel 106.

Previous driving direction link 214 and next driving direction link 216 are links to the previous and next driving direction steps, respectively, from the currently selected driving direction step or the current panoramic image (when the panoramic image shown is not associated with a driving direction step). Alternatively or additionally, previous driving direction link 214 and next driving direction link 216 may be respectively links to a previous and a next feature along the driving directions path (e.g., turn signal, block, highway exit, etc.) from the currently selected driving direction step or the current panoramic image. In an embodiment, selecting previous driving direction link 214 is equivalent to selecting the previous driving direction step in panel 106 or its associated driving direction arrow in map view 104. For example, in example view 200, selecting link 214 is equivalent to selecting step 2 in panel 106 or its associated driving direction arrow in map view 104. Similarly, selecting next driving direction link 214 is equivalent to selecting the next driving direction step in panel 106 or its associated driving direction arrow in map view 104.

According to an embodiment of the present invention, previous driving direction link 214 and next driving direction link 216 are disabled (e.g., greyed out) when no previous/next driving direction step exists based on the generated directions. In another embodiment, previous driving direction link 214 and next driving direction link 216 are also disabled when no panoramic view imagery of the previous/next driving direction step is available.

Driving direction step number 218 indicates the order of the driving direction step shown in panoramic view bubble 206, relative to the first driving direction step and the total number of driving direction steps in the generated driving directions. In an embodiment, driving direction step number 218 corresponds to the step number associated with the driving direction step in driving directions panel 106.

Zoom in link 220 enables a user to zoom in on map view 104. According to an embodiment of the present invention, one or more zoom in/zoom out levels are available. Selecting zoom in link 220 increases the zoom level of map view 104 and changes zoom in link 220 to an Overview link (e.g., Overview link 310 in FIG. 3). Subsequently, selecting the Overview link will zoom out of map view 104 to show the entire driving directions path on map view 104.

Full-screen link 224 is a link to turn on full-screen mode of panoramic view. All panoramic view features as described above are available in full-screen mode.

Panoramic view help link 224 is a link to a help menu that provides further description of panoramic view features.

Zoom controls 230 enable a user to zoom in on or zoom out of the panoramic image shown within panoramic view bubble 206. In an embodiment, zoom controls 230 include a zoom slider, as shown in FIG. 2. Alternatively or additionally, zooming functionality within the panoramic image may be done by double-clicking on the panoramic image. Note that navigating from one panoramic image to another using previous driving direction link 214 and next driving direction link 216 maintains the same zoom level for panoramic images.

Image rotation controls 232 enable a user to rotate the view within the panoramic image shown within panoramic view bubble 206. When imagery is available, 360 degrees image rotation can be performed.

As described above, panoramic view imagery may not always be available for all driving direction steps within a given driving directions path.

In certain cases, panoramic view imagery is not available for some of the driving direction steps. In other cases, panoramic view imagery is not available for any driving direction step in the driving directions path. According to an embodiment of the present invention, behavior of panoramic view will vary depending on whether panoramic view imagery is available for some or none of the driving direction steps.

Figure 3:
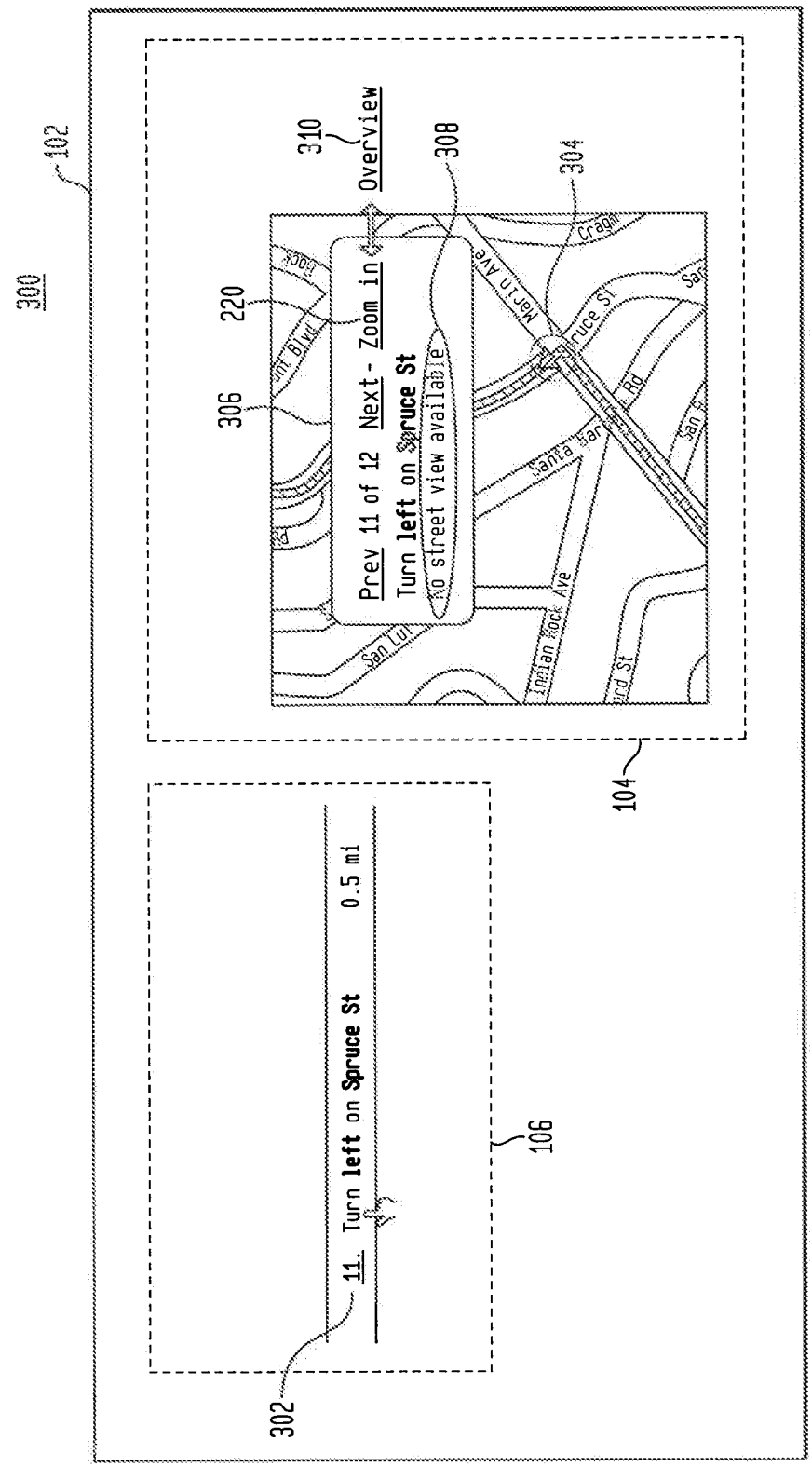
FIG. 3 is an example view that illustrates a feature of an embodiment of the present invention.
Figure 4:
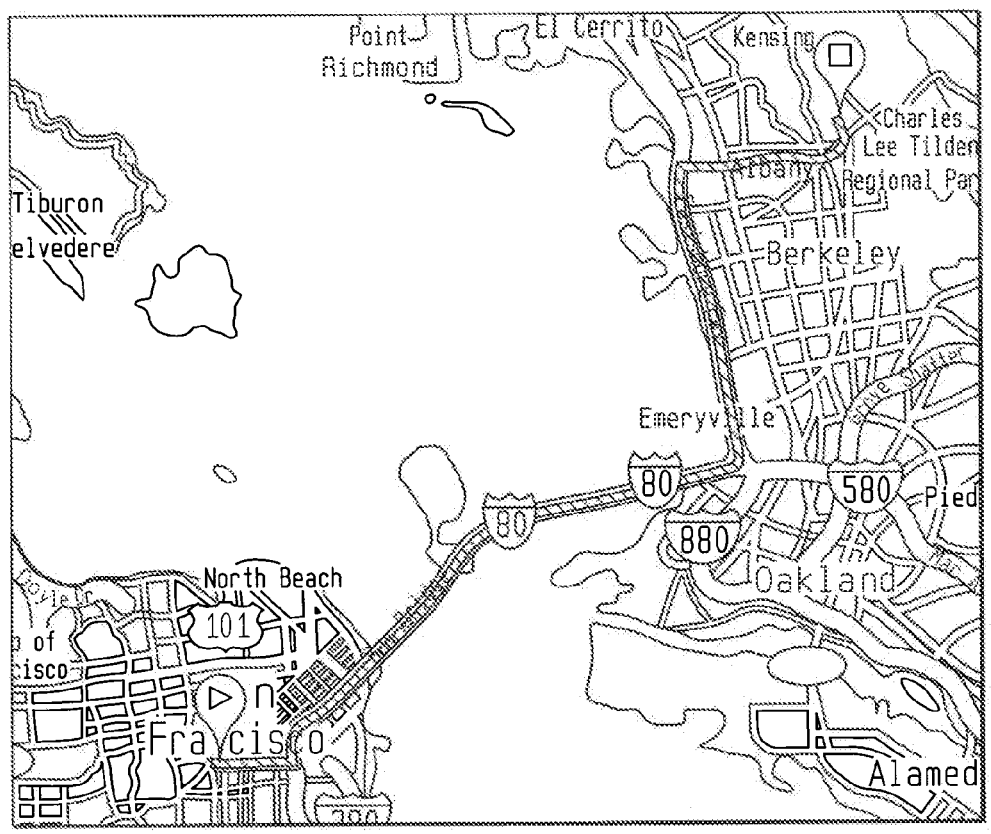
FIG. 4 is an example view that illustrates a feature of an embodiment of the present invention.

FIG. 3 illustrates an example view 300 of user interface 102 when panoramic view imagery is not available for some driving direction steps in a driving directions path. As shown in FIG. 3, driving direction step 302 is a driving direction step for which no panoramic view imagery is available. According to an embodiment of the present invention, selecting driving direction step 302 or associated driving direction arrow 304 opens a text-based bubble 306. Text-based bubble 306 includes all features of panoramic view bubble 206 described above, except for a panoramic image (and features overlaid on the image) of the driving action associated with driving direction step 302. Instead, bubble 306 includes a text description 308, which indicates that no panoramic view imagery is available for the selected driving direction step 302. Additionally, selecting zoom in link 220 changes it to overview link 310. Selecting overview link 310 zooms out of map view 104 to show the entire driving directions path, as illustrated by example view 400 in FIG. 4, for example.

Figure 5:
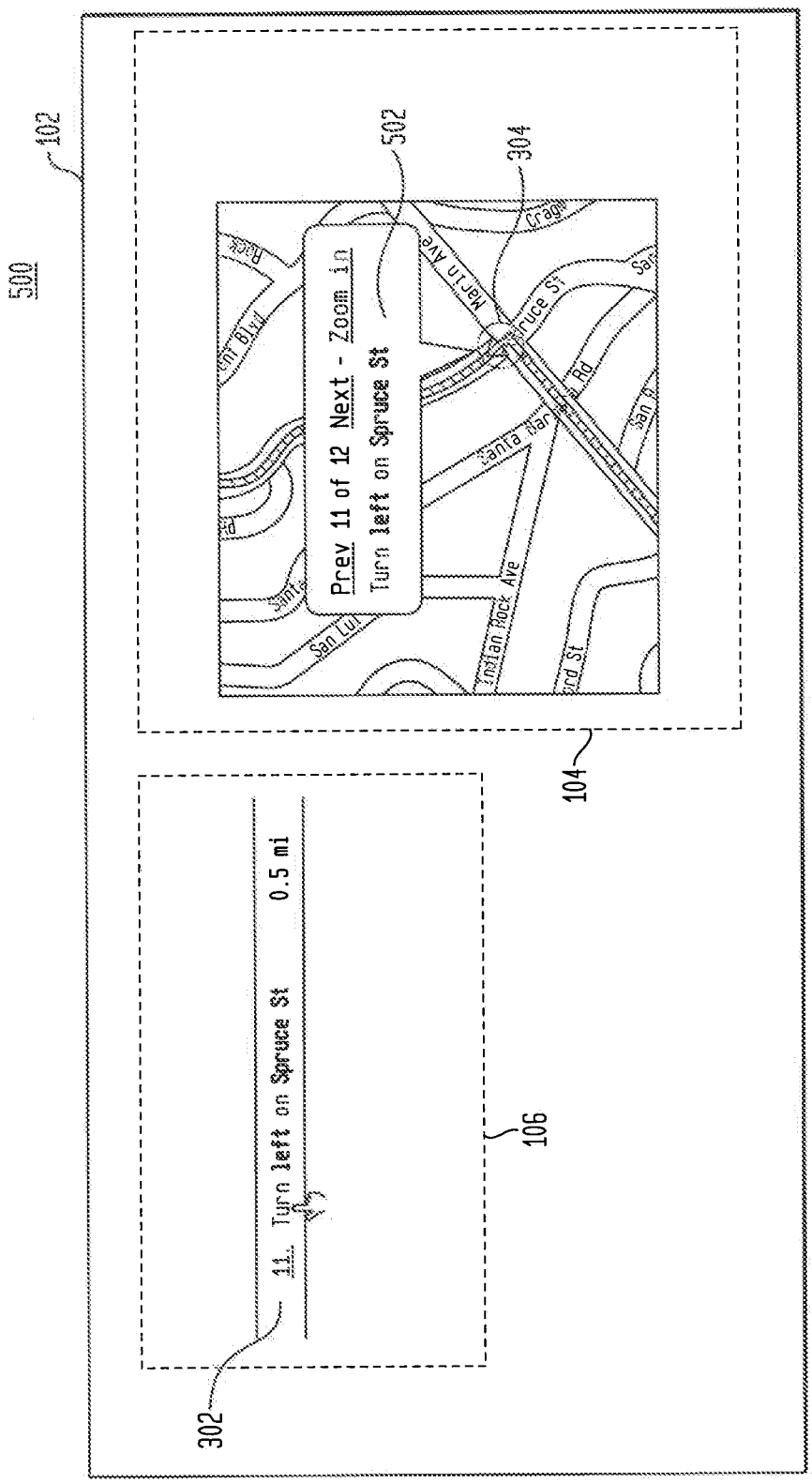
FIG. 5 is an example view that illustrates a feature of an embodiment of the present invention.

FIG. 5 is an example view 500 of user interface 102 when panoramic view imagery is not available for any driving direction step in a driving directions path. As shown in FIG. 5, driving direction step 302 is a driving direction step for which no panoramic view imagery is available. According to an embodiment of the present invention, selecting driving direction step 302 or associated driving direction arrow 304 opens a text-based bubble 502. Text-based bubble 502 includes similar features as bubble 306 described above but does not include text description 308, since panoramic view imagery is not available for any driving direction step in example view 500.

Systems and Methods for Enabling Panoramic View

Embodiments of the present invention may be implemented using hardware, software or a combination thereof and may be implemented in one or more computer systems or other processing systems.

Figure 6:
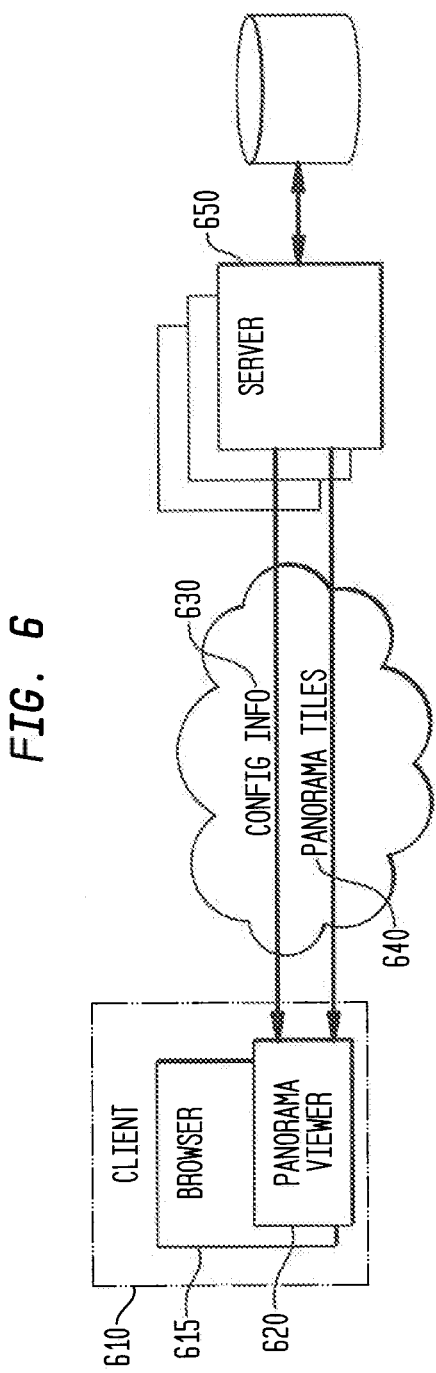
FIG. 6 is a diagram of an exemplary distributed system suitable for practicing an embodiment.

FIG. 6 is a distributed system suitable for practice of an embodiment of the invention. A client 610 communicates with one or more servers 650, for example, across a network such as the Internet or a local area network. Client 610 can be a general-purpose computer with a processor, local memory, a display, and one or more input devices such as a keyboard or a mouse. Alternatively, client 610 can be a specialized computing device such as, for example, a mobile handset or a portable navigation device (e.g., in-car navigation device). Server(s) 650, similarly, can be implemented using any general-purpose computer capable of serving data to client 610.

Client 610 executes a panorama viewer 620, the operation of which is further described herein.

As illustrated by FIG. 6, panorama viewer 620 requests configuration information 630 from server(s) 650. The configuration information includes meta-information about a panoramic image to be loaded, including information on links within the panoramic image to other panoramic images (e.g., links provided by panoramic navigation controls within the panoramic image). In an embodiment, the configuration information is presented in a form such as Extensible Markup Language (XML) or JavaScript Object Notation (JSON). Panorama viewer 620 retrieves visual assets 640 for the panoramic image, for example, in the form of panoramic image tiles. In another embodiment, the visual assets include the configuration information in the relevant file format. Panorama viewer 620 presents a visual representation on the client display of the panoramic image and additional user interface elements, as generated from configuration information 630 and visual assets 640, as further described herein. As a user interacts with an input device to manipulate the visual representation of the panoramic image, panorama viewer 620 updates the visual representation and proceeds to download additional configuration information and visual assets as needed. Further description of panorama viewer 620 and its operation can be found in commonly owned U.S. patent application Ser. No. 11/754,267, which is incorporated by reference herein in its entirety.

In an embodiment, panorama viewer 620 can be a standalone application, or it can be executed within a browser 615, such as Mozilla Firefox or Microsoft Internet Explorer. Panorama viewer 620, for example, can be executed as a script within browser 615, as a plug-in within browser 615, or as a program which executes within a browser plug-in, such as the Adobe (Macromedia) Flash plug-in.

In an embodiment, panorama viewer 620 is integrated with a mapping service, such as the one described in U.S. Pat. No. 7,158,878, "DIGITAL MAPPING SYSTEM", which is incorporated by reference in its entirety herein.

Figure 7:
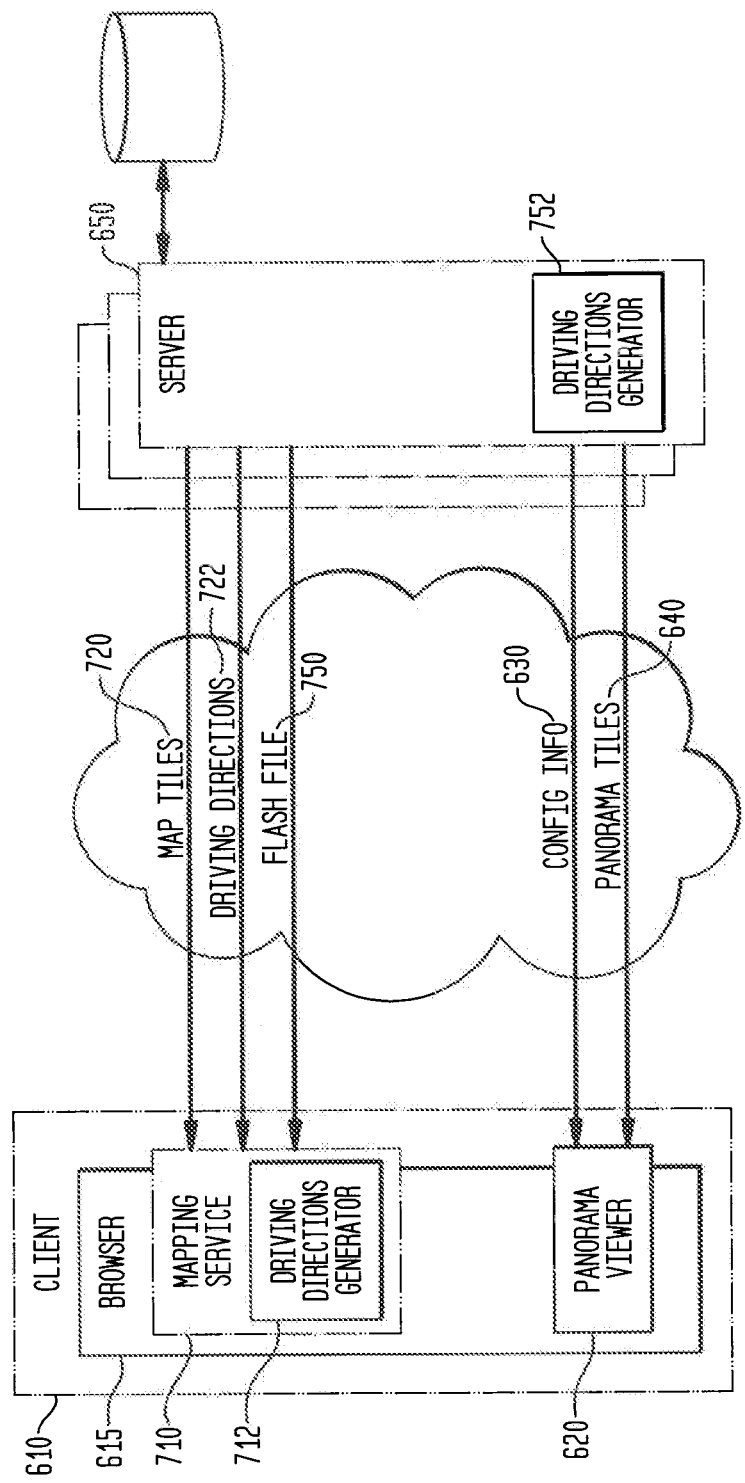
FIG. 7 is a diagram illustrating an example of how a mapping/driving directions service can be integrated with a panorama viewer, in accordance with an embodiment.

FIG. 7 illustrates an example of how a mapping service and/or driving directions service can be integrated with panorama viewer 620. Mapping service module 710 displays a visual representation of a map. For example, mapping service module 710 displays a map view (e.g., map view 104). Driving directions service module 712 displays driving directions within one or more of a map view (e.g., map view 104) and a driving directions panel (e.g., driving directions panel 106). Driving directions service module 712 may be a sub-module of mapping service module 710, as illustrated in FIG. 7. Alternatively, mapping service module 710 and driving directions service module 712 may be separate module or integrated within a single module that provides both mapping service and driving directions service.

Figure 9:
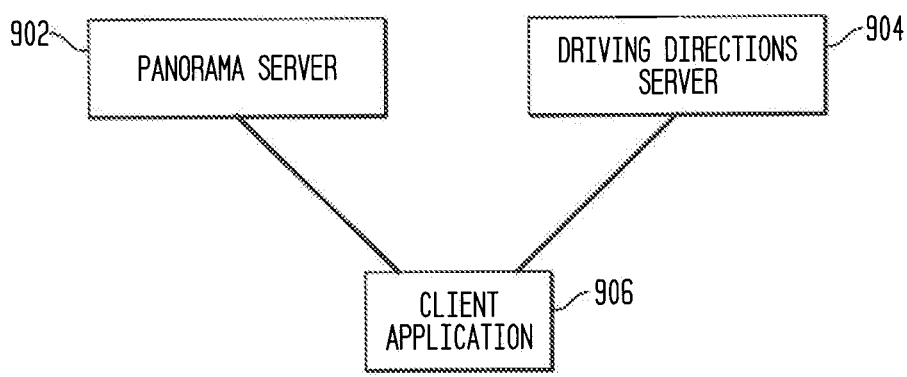
FIG. 9 illustrates an exemplary system architecture according to an embodiment of the present invention.

Mapping service and/or driving directions service is implemented using a combination of markup and scripting elements, e.g., using HTML and Javascript. As the viewport is moved and/or new driving directions generated, mapping module 710 and/or driving directions module 712 request additional map tiles 720 and/or driving directions 722 from server(s) 650, assuming the requested map tiles and/or driving directions have not already been cached in local cache memory. In an embodiment, server 650 includes a driving directions generator 752, capable of generating driving directions according to user input. Notably, the server(s) which serve map tiles 720 and/or driving directions 722 can be the same or different server(s) from the server(s) which serve panorama tiles 640 or the other data involved herein. For example, FIG. 9 illustrates an exemplary system architecture 900 according to an embodiment of the present invention, where the server(s) which serve map tiles 720 and/or driving directions 722 are different from the server(s) which serve panorama tiles 640 and configuration information 630 associated therewith. As shown in FIG. 9, panorama server 902 is a server responsible for serving panoramic images and metadata to client application 906. In an embodiment, serving panoramic images to client application 906 includes selecting a subset of locations on the map and serving panoramic images associated with the selected subset of locations to client application 906. In an embodiment, this includes selecting the subset of locations offline by panorama server 902 and serving the selected subset of locations in real-time to client application 906.

Driving directions server 904 is a distinct server from panorama server 902 and is responsible for computing and serving driving direction steps to client application 906. In an embodiment, driving directions server 904 includes a driving directions generator, such as driving directions generator 752, for example.

Client application 906, as described above, may be a browser, such as browser 615, which executes a panorama viewer, such as panorama viewer 620. The panorama viewer is responsible for rendering panoramic images as well as other user interface elements received from panorama server 902. Client application 906 may farther include a mapping service 710 and/or a driving directions service 712, as described above. Mapping service 710 and driving directions service 712 together enable various representations of driving direction steps received from driving directions server 904, including a driving directions panel representation and a map view representation, where driving directions are presented as a polyline overlaid on a map.

According to the embodiment of FIG. 9, client application 906 receives data from panorama server 902 and driving directions server 904. Accordingly, client application 906 processes and combines data from both panorama server 902 and driving directions server 904 in order to determine the appropriate panoramic image to be rendered by the panorama viewer to a user. In an embodiment, this includes receiving driving direction steps from driving direction server 904, encoded as a set of locations or vertices on the map; requesting and receiving from the panorama server panoramic images based on the received set of locations; and associating the received panoramic images with the received set of locations. In an embodiment, the panoramic images that are received from the panorama server include not only images that are directly associated with the driving direction steps, but also "neighbor" images that are geographically proximate to the driving direction steps. This enables, as described above, panoramic navigation off of the driving directions route.

Referring back to FIG. 7, in an embodiment, mapping service module 710 and/or driving directions service module 712 can request that browser 615 proceed to download a program 750 for panorama viewer 620 from server(s) 650 and to instantiate any plug-in necessary to run program 750. Program 750 may be a Flash file or some other form of executable content. Panorama viewer 620 executes and operates as described above. Alternatively, configuration information 630 and even panorama tiles 640 can be retrieved by mapping service module 710 and passed to panorama viewer 620. Panorama viewer 620 and mapping/driving directions service 710 communicate so as to coordinate the operation of the user interface elements, to allow the user to interact with either panorama viewer 620 or mapping service 710, and to have the change in location or orientation reflected in both.

As described above, embodiments of the present invention can be operated according to a client-server configuration. Alternatively, embodiments can be operated solely at the client, with configuration information 630, panorama tiles 640, map tiles 720, and driving directions 722 all available at the client. For example, configuration information 630, panorama tiles 640, map tiles/driving directions 650 may be stored in a storage medium accessible by client 610, such as a CD ROM or hard drive, for example. Accordingly, no communication with server 650 would be needed.

Figure 8:
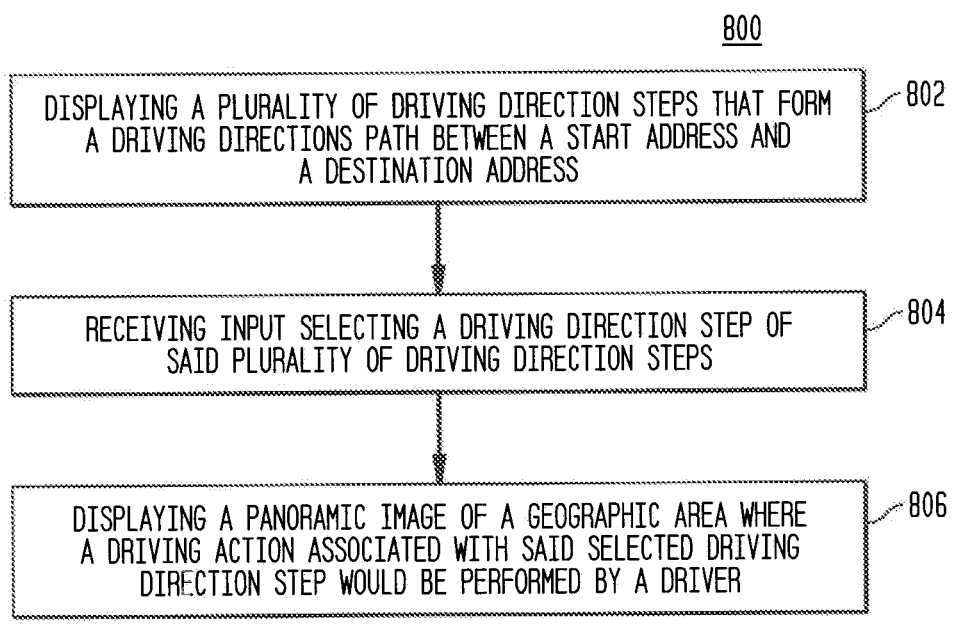
FIG. 8 is a process flowchart of method for enabling enhanced driving directions with panoramic images according to an embodiment of the present invention.

FIG. 8 is a process flowchart 800 of a method for displaying panoramic images within driving directions according to an embodiment of the present invention. Process 800 includes steps 802, 804, and 806. For clarity, process 800 is described with reference to the example systems of FIGS. 6 and 7 described above, but is not intended to be limited thereto.

Process 800 begins in step 802, which includes displaying a plurality of driving direction steps that form a driving directions path between a start address and a destination address. For example, step 802 may be performed by mapping service module 710 and/or driving directions service module 712 in FIG. 7. In an embodiment, step 802 further includes displaying a step-by-step list of the plurality of driving direction steps in a driving directions panel. In another embodiment, step 802 further includes overlaying a graphical illustration of the plurality of driving directions on a road map within a map view. For example, step 804 may be performed by driving directions service module 712 in the example system of FIG. 7.

Process 800 then proceeds to step 804, which includes receiving input selecting a driving direction step of said plurality of driving direction steps. Step 804 may be performed, for example, by driving directions service module 712.

Subsequently, in step 806, process 800 includes displaying a panoramic image of a geographic area where a driving action associated with said selected driving direction step would be performed by a driver. In an embodiment, step 806 further includes orienting the panoramic image such that the panoramic image shows the geographic area from a similar viewpoint as that of a driver performing the driving action. In another embodiment, step 806 further includes displaying the panoramic image within a panoramic image bubble having a tail that points to the driving direction step on the map view. Step 806 may be performed, for example, by panorama viewer 620 described above in FIGS. 6 and 7.

In an embodiment, process 800 further includes displaying a first visual indicator in association with the driving direction step in the driving directions panel and displaying the panoramic image when the first visual indicator is selected. Additionally or alternatively, process 800 includes displaying a second visual indicator on the map view associated with the driving direction step and displaying the panoramic image when the second visual indicator is selected. These functions may be performed, for example, by driving directions service module 712.

In another embodiment, process 800 further includes displaying a driving direction overlay associated with the driving direction step on the panoramic image. Additionally, process 800 may include displaying a first panoramic navigation control on the panoramic image that illustrates the driving action associated with the driving direction step. In an embodiment, process 800 further includes simulating the driving action when the first panoramic navigation control is selected. This includes changing the orientation of the panoramic image or displaying another panoramic image when panoramic imagery is available. These functions may be performed, for example, by panorama viewer 620.

Additional Features

Additional features according to embodiments of the present invention will now be presented. These features generally relate to techniques for rendering a representation of the driving directions path (or polyline) on a panoramic image under various scenarios.

Polyline Rendering on a Panoramic Image

As described above, one feature according to embodiments of the present invention includes displaying a representation of the driving directions path, overlaid on the panoramic image, to enhance the representation of the driving direction step in the panoramic view bubble. This is illustrated, for example, in FIG. 2, which shows driving direction overlay 208, which is a portion of driving directions path or polyline 110, overlaid on the panoramic image shown in panoramic view bubble 206. To enable this feature, different techniques according to embodiments of the present invention may be used, as will be further described below.

Figure 10:
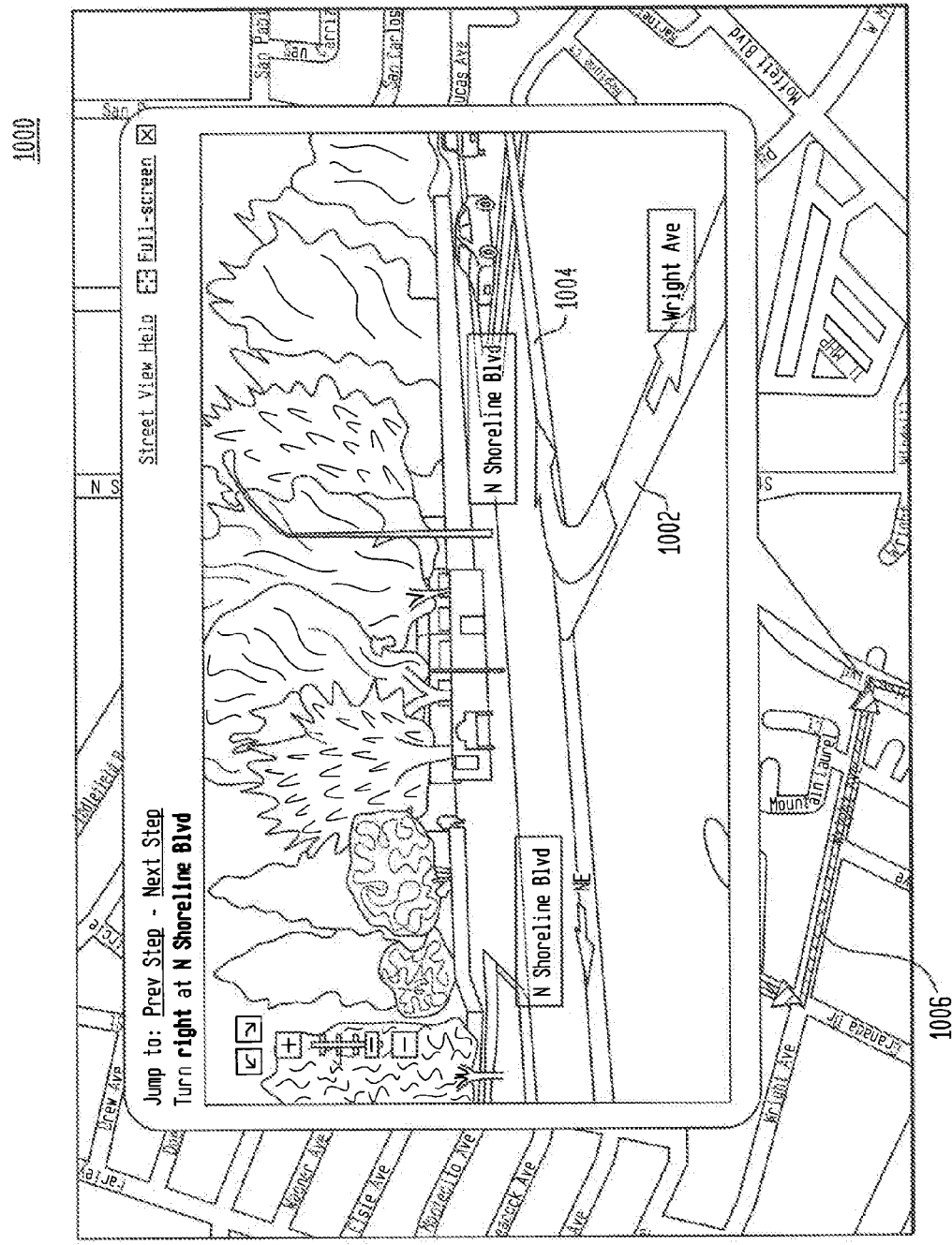
FIG. 10 is an example view that illustrates a feature of an embodiment of the present invention.

According to an embodiment of the present invention, whether or not a polyline overlay is rendered on a panoramic image depends on the proximity of the location of the panoramic image to the driving directions path represented by the polyline. If the location of the panoramic image is determined as sufficiently close to the driving directions path, then a polyline overlay is shown in the panoramic image. Otherwise, no polyline overlay is rendered on the panoramic image. In an embodiment, a polyline overlay rendered on a panoramic image includes two segments of the polyline, as illustrated, for example, by polyline segments 1002 and 1004 of polyline 1006, in example view 1000 of FIG. 10. In an embodiment, polyline segments are rendered in blue or other easily noticeable color on the panoramic image, while segments not belonging to the polyline are shown in a less noticeable color (e.g., white or grey).

Accordingly, in an embodiment, polyline rendering includes determining the location of the panoramic image; determining if the location of the panoramic image is proximate to the driving directions path; and, when proximate, determining the two segments of the polyline that will be rendered on the panoramic image by the panorama viewer. Further, in an embodiment, determining which segments of the polyline will be rendered on the panoramic image depends on the relative proximity of the location of the panoramic image to the driving directions path. This is further described below with respect to the following exemplary scenarios.

Figure 11:
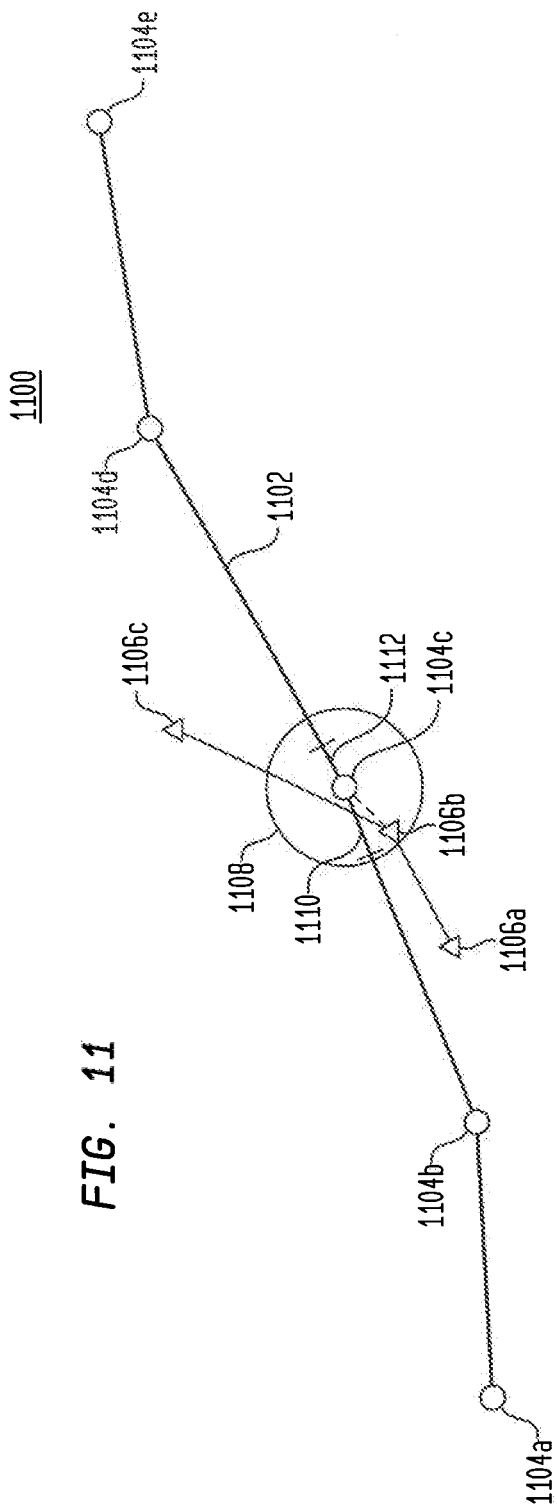
FIG. 11 illustrates an example scenario according to an embodiment of the present invention.

FIG. 11 illustrates an example scenario 1100 according to an embodiment of the present invention. Example scenario 1100 shows a polyline 1102, which represents a driving directions path. Polyline 1102 includes a plurality of vertices 1104. Vertices 1104 may be associated, for example, with respective driving direction steps of the driving directions path represented by polyline 1102. Example scenario 1100 further shows a plurality of panoramic images 1106, which are images of respective geographic locations, along or close to the driving directions path.

In example scenario 1100, panoramic image 1106b represents the panoramic image being shown by the panorama viewer and for which polyline rendering is to be performed.

In an embodiment, the location of panoramic image 1106b is compared against the locations of vertices 1104 of polyline 1102. If the location of panoramic image 1106b is determined to be sufficiently close to one of vertices 1104, then panoramic image 1106b is associated with that vertex, and the two segments of the polyline directly adjacent to that vertex are rendered on the panoramic image. For example, in example scenario 1100, panoramic image 1106b is associated with vertex 1104c, by virtue of its location falling within a circle 1108 centered at vertex 1104c, Thus, segments 1110 and 1112 of polyline 1102, which are directly adjacent to vertex 1104, will be rendered on panoramic image 1106b.

Figure 12:
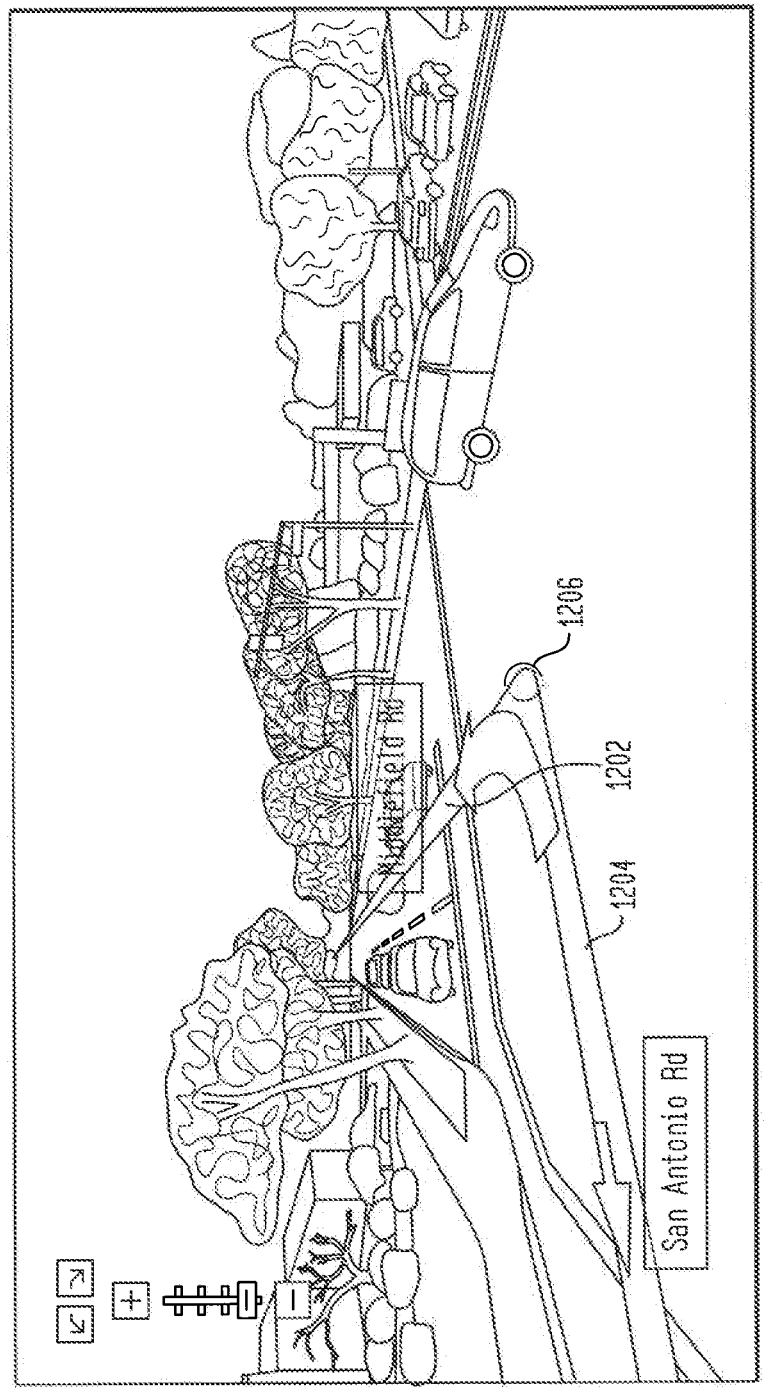
FIG. 12 is an example view that illustrates a feature of an embodiment of the present invention.

FIG. 12 is an example view 1200, which illustrates polyline rendering on a panoramic image in a scenario that may correspond to example scenario 1100. For example, the panoramic image shown in example view 1200 may correspond to panoramic image 1106b of example scenario 1100. Similarly, polyline segments 1202 and 1204 may correspond to segments 1110 and 1112 of example scenario 1100. Further, for the purpose of illustration, a circle 1206 is additionally added to indicate the location of the polyline vertex with which the panoramic image shown is associated. Circle 1202 may correspond to vertex 1104c of example scenario 1100.

As would be understood by a person skilled in the art based on the teachings herein, various techniques may be used to determine the proximity of a panoramic image to a vertex of a polyline, including through a proximity circle, such as circle 1108, described above.

Figure 13:
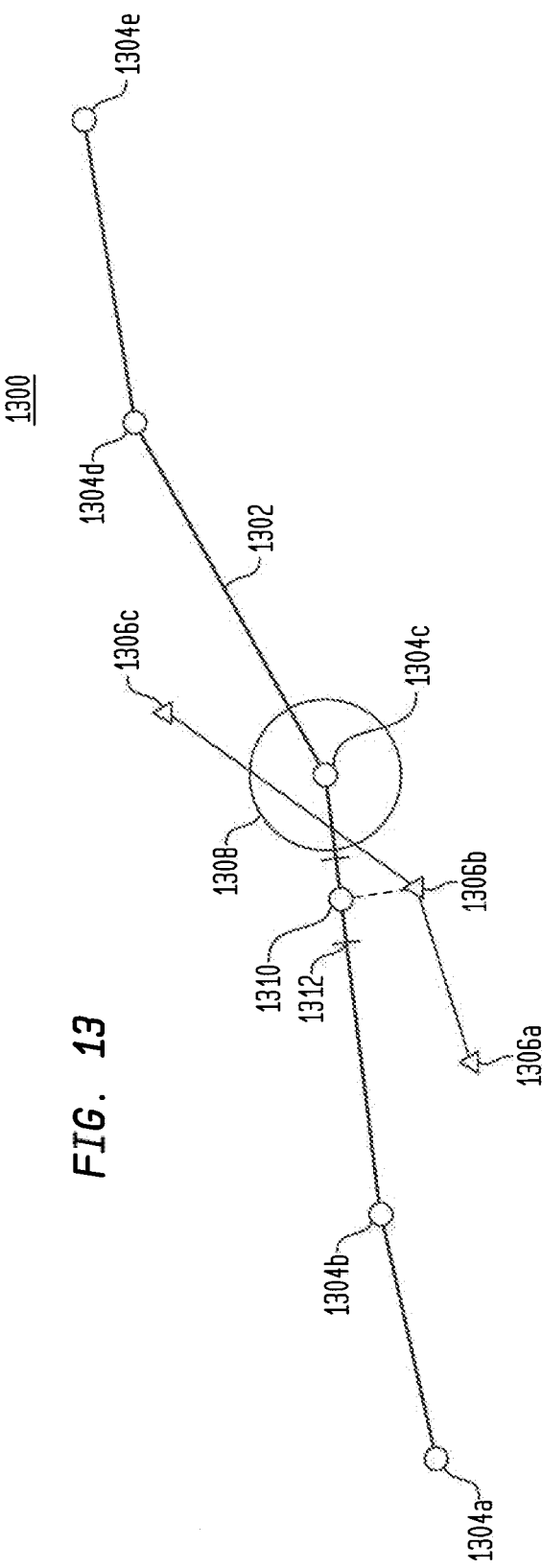
FIG. 13 illustrates an example scenario according to an embodiment of the present invention.

FIG. 13 illustrates another example scenario 1300 according to an embodiment of the present invention. Example scenario 1300 shows a polyline 1302, having a plurality of vertices 1304, and a plurality of panoramic images 1306. Panoramic image 1306b represents the panoramic image being shown by the panorama viewer and for which polyline rendering is being performed.

As shown in FIG. 13, panoramic image 1306b is closest to vertex 1304c of vertices 1304, but is not sufficiently close to vertex 1304c to fall within its proximity circle 1308. Therefore, panoramic image 1306b is not sufficiently close to a vertex of polyline 1302 to have polyline rendering performed as described above with respect to FIGS. 11 and 12.

Accordingly, in an embodiment, polyline rendering on panoramic image 1306b is performed by first projecting the location of panoramic image 1304b onto polyline 1302, to form a projection node 1310 on projection segment 1312 of polyline 1302. Subsequently, if panoramic image 1304b is determined to be sufficiently close to projection node 1310, panoramic image 1304b will be associated with node 1310, and the two segments of polyline 1302 rendered on panoramic image 1304b will both be parallel to projection segment 1312 of polyline 1302. For example, in scenario 1300, panoramic image 1306b is deemed to be sufficiently close to projection node 1310 and is thus associated with node 1310.

Figure 14:
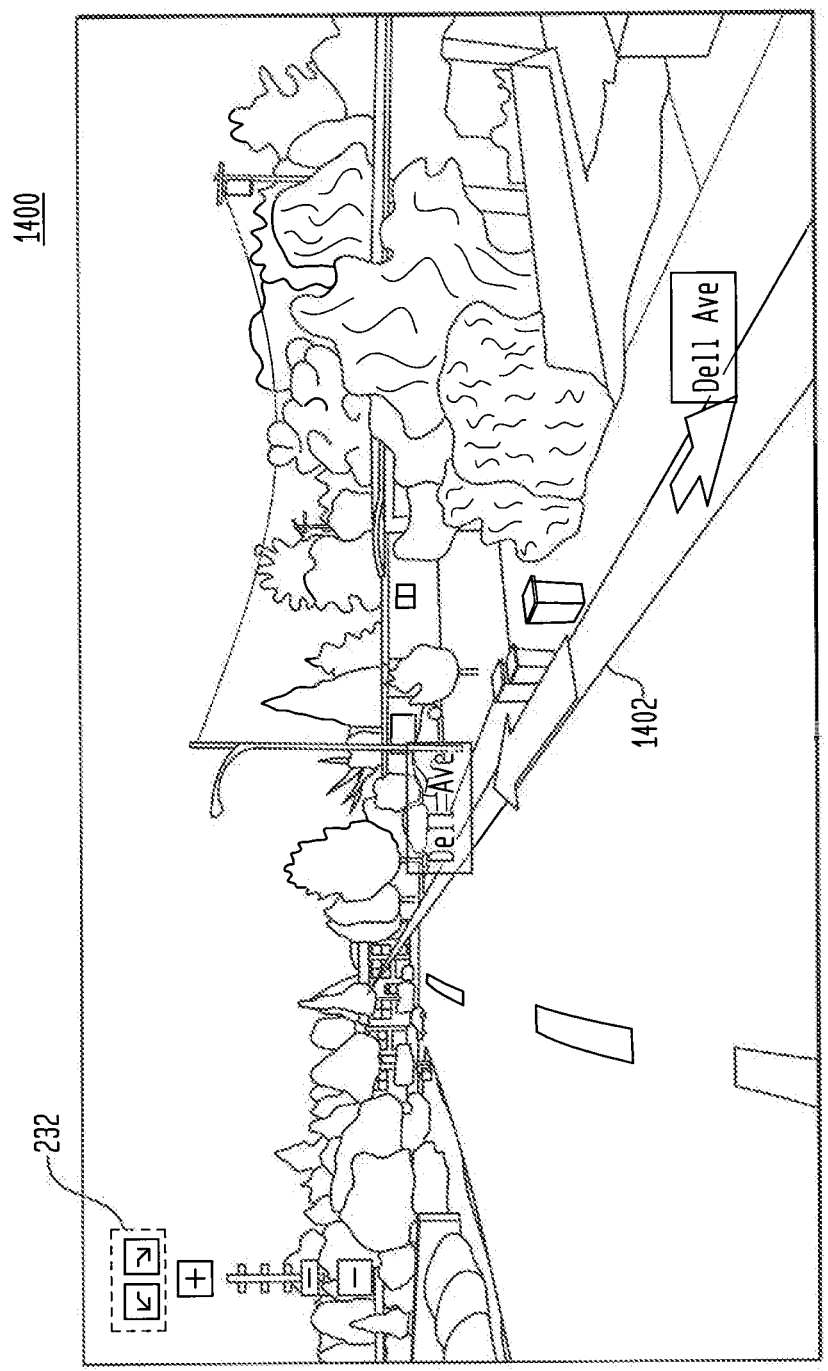
FIG. 14 is an example view that illustrates a feature of an embodiment of the present invention.

FIG. 14 is an example view 1400, which illustrates polyline rendering on a panoramic image in a scenario that may correspond to example scenario 1300. For example, the panoramic image shown in example view 1300 may correspond to panoramic image 1306b of example scenario 1300. As shown in FIG. 14, since the polyline segments that are rendered are both parallel to the projection segment, the polyline segments will appear as a single continuous line as illustrated by line 1402. Note that depending on the image view orientation of the panoramic image, the projection segment may or may not be rendered on the panoramic image. For example, in example view 1400, the projection segment may be rendered when the user rotates the panoramic image using image rotation controls 232.

When the location of the panoramic image is such that the panoramic image is not sufficiently close to a vertex or to a projection node of the polyline, then the panoramic image is sufficiently far from the driving directions path that no polyline rendering is performed. This is illustrated in FIGS. 15 and 16, which are described below.

Figure 15:
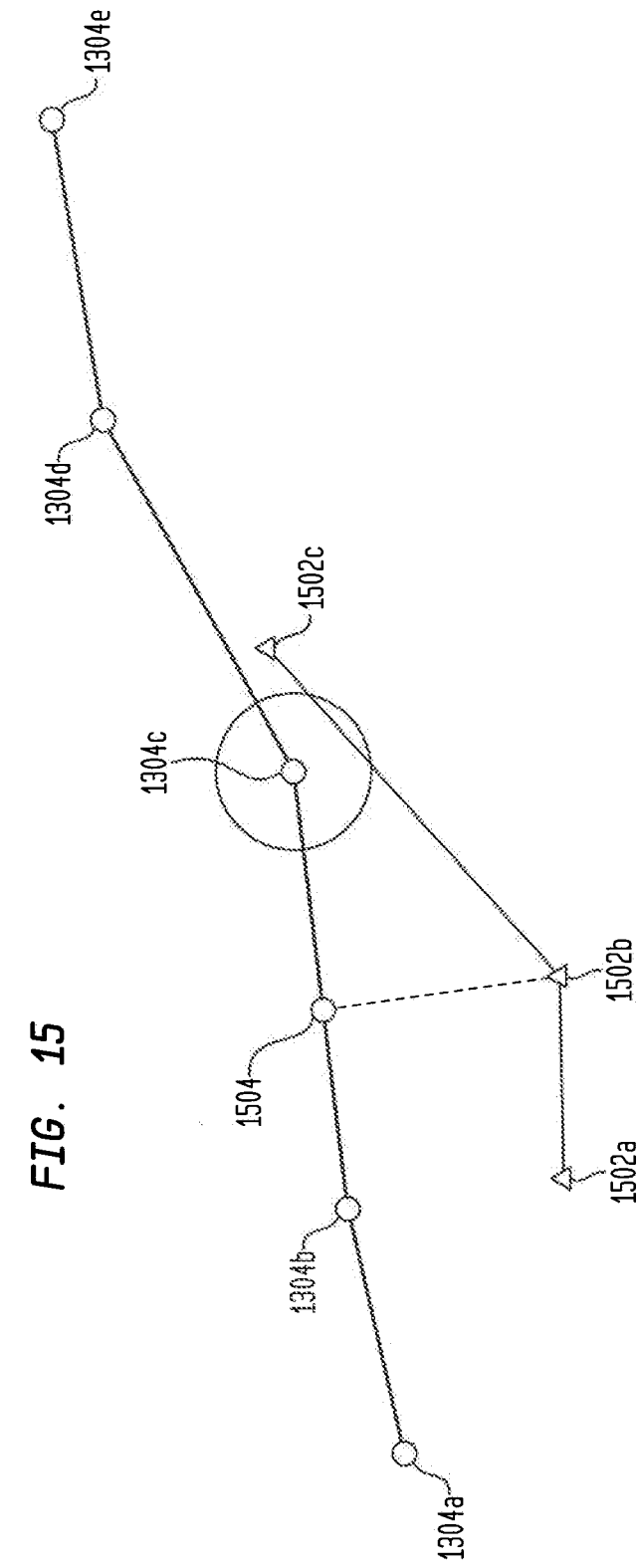
FIG. 15 illustrates an example scenario according to an embodiment of the present invention.

FIG. 15 illustrates an example scenario 1500 according to an embodiment of the present invention. Example scenario 1500 shows a plurality of panoramic images 1502 relative to polyline 1302. Panoramic image 1502b represents the panoramic image being shown by the panorama viewer and for which polyline rendering is being performed.

As shown in FIG. 15, panoramic image 1502b is sufficiently far from any one of vertices 1304 or projection node 1504 that polyline rendering is not performed. Accordingly, when a user navigates to panoramic image 1502b, no polyline segments of polyline 1302 will be seen by the user.

Figure 16:
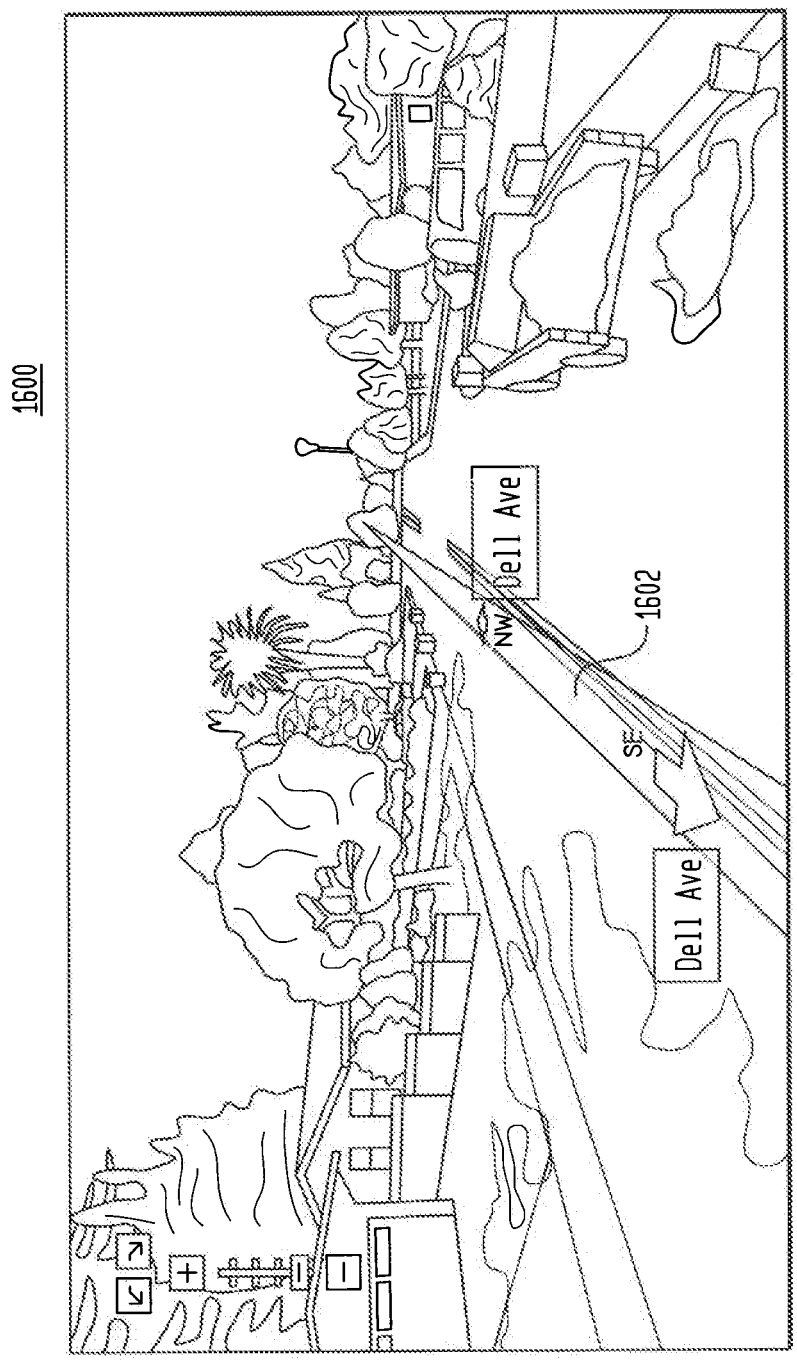
FIG. 16 is an example view that illustrates a feature of an embodiment of the present invention.

FIG. 16 is an example view 1600, which illustrates a scenario that may correspond to example scenario 1500. For example, the panoramic image shown in example view 1600 may correspond to panoramic image 1502b, As shown in FIG. 16, no polyline segments are rendered on the panoramic image. Instead, segments that appear on the panoramic image (e.g., segment 1602) do not belong to the polyline and are shown in a less noticeable color (e.g., white or grey).

Other scenarios that may occur in the context of polyline rendering include scenarios involving partial or incomplete panoramic coverage of a driving directions path. This may occur when locations on the polyline (i.e., vertex locations) and panoramic images output by the panoramic selector do not entirely match.

Figure 17:
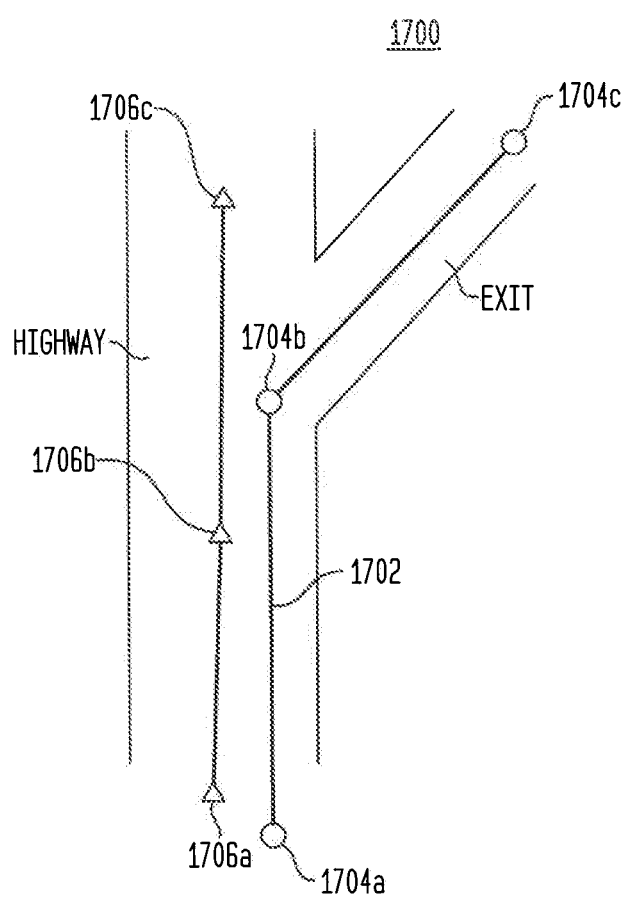
FIG. 17 illustrates an example scenario according to an embodiment of the present invention.
Figure 18:
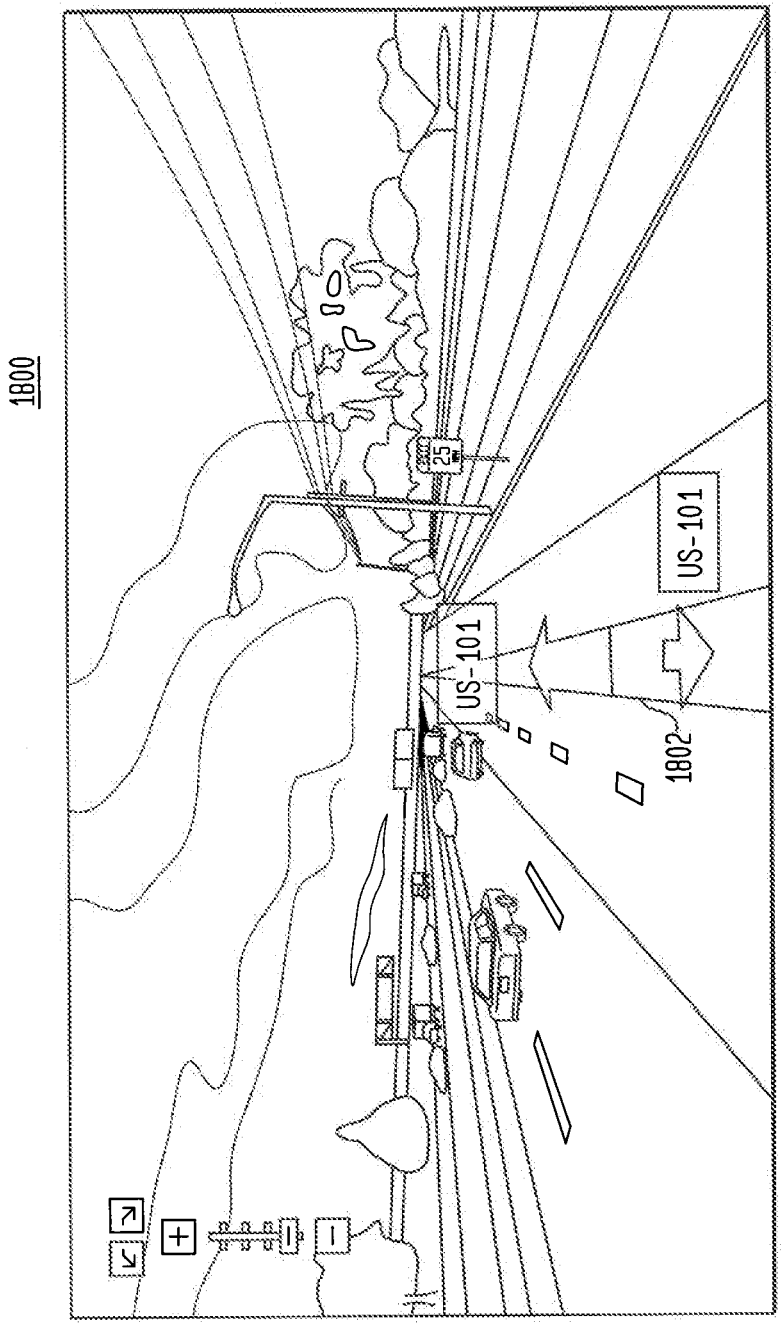
FIG. 18 is an example view that illustrates a feature of an embodiment of the present invention.
Figure 19:
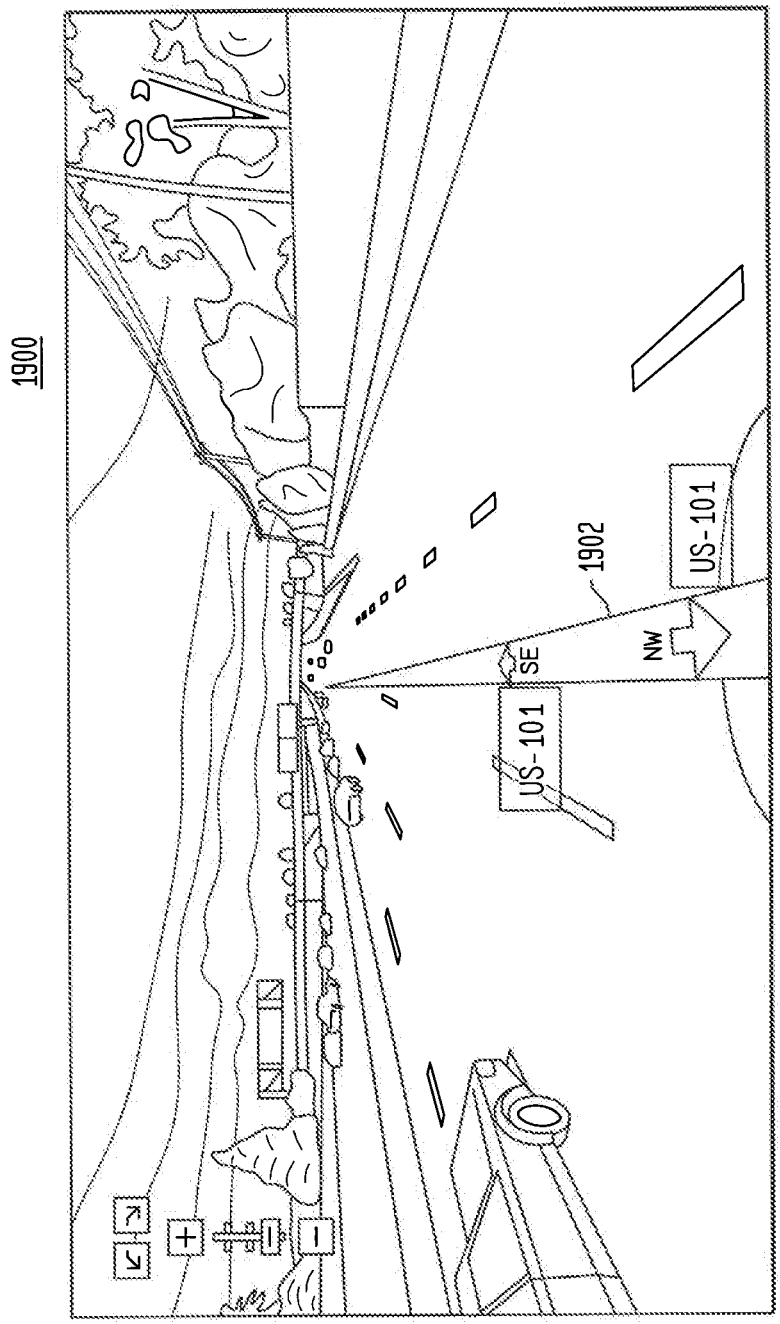
FIG. 19 is an example view that illustrates an example scenario.

FIG. 17 is an example scenario 1700, which illustrates a scenario involving partial panoramic coverage. Example scenario 1700 shows a polyline 1702, which includes first and second vertices 1704a and 1704b, located on a highway, and a third vertex 1704c, located on an exit following a ramp off of the highway. Panoramic images received from the panoramic selector in example scenario 1700 include panoramic images 1704a, 1704b, and 1704c, all located directly on the highway.

As shown in FIG. 17, vertices 1704 and panoramic images 1706 do not entirely match. For example, panoramic image 1706c is sufficiently far from any one of vertices 1704 or polyline 1702 that it is not associated with any vertex or segment of polyline 1702. Further, no panoramic image 1706 is sufficiently close to vertex 1704c to be associated with it.

In example scenario 1700, panoramic image 1706b represents the panoramic image being rendered by the panorama viewer. Accordingly, an example view of panoramic image 1706b when oriented to the North can be as illustrated in example view 1800. Note that in such orientation of panoramic image 1706b, polyline 1702 is locally straight and is rendered as such using polyline segment 1802 in example view 1800.

However, when the user navigates from panoramic image 1706b to panoramic image 1706c, which is not associated with any vertex or segment of polyline 1702, polyline 1702 is no longer rendered by the panorama viewer. The effect is that the polyline seems to suddenly disappear from the user's sight, and the user will need to re-locate the polyline by navigating backwards. This is illustrated in example view 1900, which shows the view when the user navigates forward from example view 1800. As shown, the polyline is not rendered in example view 1900. Instead, line segments indicating directions not related to the driving directions path may be shown (e.g., segment 1902 represents driving directions along route US-101, which at the view shown in example view 1900 is no longer part of the driving directions path).

Figure 20:
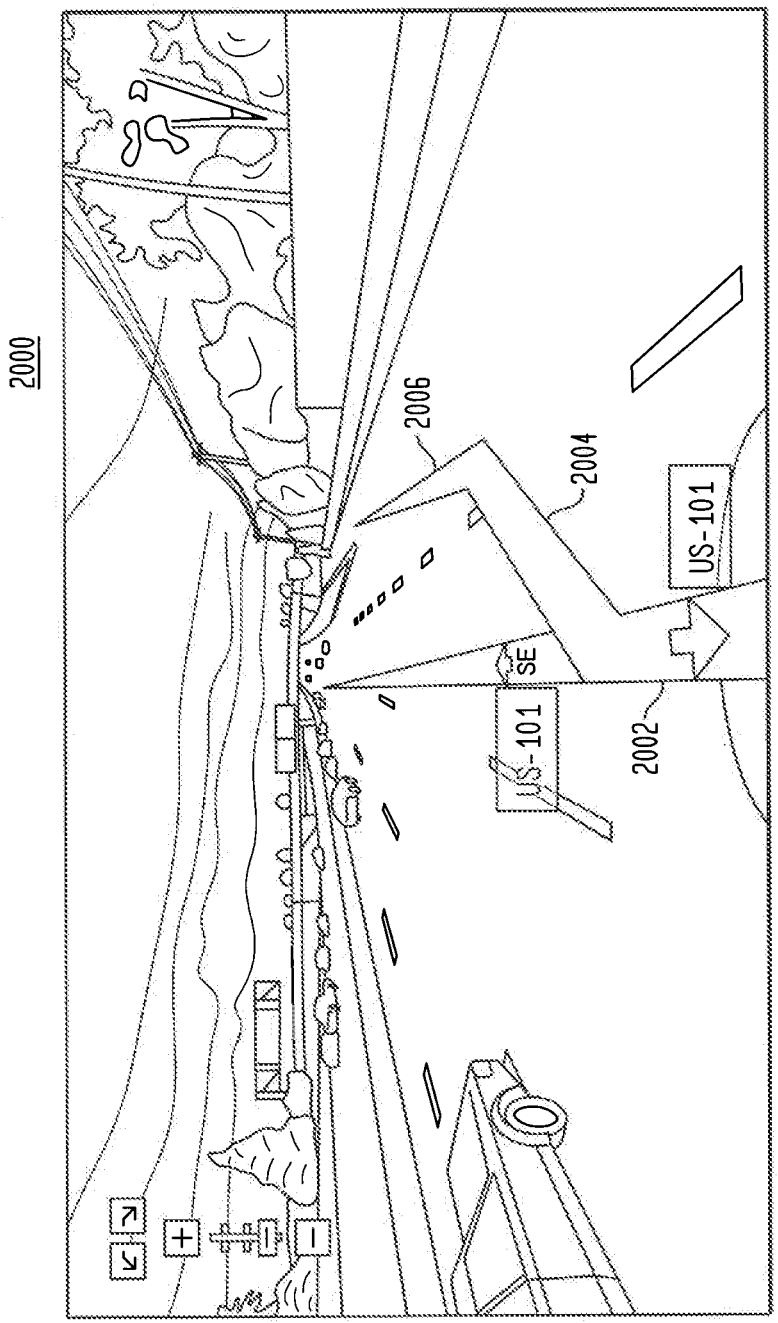
FIG. 20 is an example view that illustrates a feature of an embodiment of the present invention.

In an embodiment, the type of situation illustrated in example view 1900 can be avoided by anticipating whether the next panoramic image is on or off the driving directions path (or alternatively whether it is associated with a vertex or segment of the polyline), and when it is not on the driving directions path, rendering the polyline on the panoramic image in a way that indicates to the user that he/she is about to navigate off the driving directions path. In an embodiment, this includes rendering one or more segments of the polyline of the panoramic image to indicate the driving direction step that would have had to be performed prior to reaching the current panoramic view. This is illustrated in FIG. 20, which shows an example view 2000, in which polyline segments 2002, 2004, and 2006 are rendered on the panoramic image to highlight the driving direction step (taking an exit) that needs to be performed.

Variations

As would be understood by a person skilled in the art based on the teachings herein, several variations of the above described features of panoramic view can be envisioned. These variations are within the scope of embodiments of the present invention. For the purpose of illustration only and not limitation, a few variations are provided herein. For example, one skilled in the art can envision several variations in the panoramic imagery style, including, for example, bird's eye oblique imagery, which is imagery shot at an angle instead of top down. Variations in displaying and/or opening panoramic images may also be envisioned, including, for example, showing thumbnail images when a user hovers over a driving directions path in the map view. In other variations, panoramic images can be replaced or complemented with 3D models, full-motion video, fully-immersive video or full-motion video of 360 degrees images (i.e., user sees full-motion video but also has the ability to manipulate image view orientation as video plays, simulating a driving experience), live feeds from video cameras, etc. to provide enhanced driving directions.

Conclusion

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for displaying panoramic images within driving directions, comprising:
   (a) displaying a plurality of driving direction steps that form a driving directions path between a start address and a destination address;
   (b) receiving user input selecting a driving direction step of the plurality of driving direction steps;
   (c) displaying a panoramic image of a geographic area where a driving action associated with the selected driving direction step would be performed by a driver;
   (d) displaying a first navigation control on the panoramic image, wherein the first navigation control illustrates the driving action associated with the driving direction step;
   (e) simulating the driving action when the first navigation control is selected;
   (f) determining that the panoramic image is sufficiently proximate to the driving directions path based on a polyline representative of the driving directions path, the polyline including one or more segments and one or more vertices; and
   (g) determining whether the sufficient proximity of the panoramic image to the driving directions path is based on a nearest vertex of the one or more vertices of the polyline, or on a nearest segment of the one or more segments of the polyline;
   (h) in a case where the sufficient proximity is based on the nearest vertex, rendering a first segment and a second segment of the polyline, adjacent to the nearest vertex, on the panoramic image; and
   (i) in a case where the sufficient proximity corresponds to the nearest segment, rendering a third segment and a fourth segment of the polyline, both parallel to the nearest segment, on the panoramic image.

2. The method of claim 1, wherein step (a) comprises displaying the plurality of driving direction steps using one or more of a map view and a driving directions panel.

3. The method of claim 2, wherein step (a) further comprises at least one of:
   displaying a step-by-step list of the plurality of driving direction steps within the driving directions panel;
   displaying a first visual indicator in association with the driving direction step in the driving directions panel, the first visual indicator indicating that a panoramic image is available for the driving direction step;
   overlaying a graphical illustration of the plurality of driving direction steps on a road map that encompasses the plurality of driving direction steps within the map view; and
   displaying a second visual indicator in association with the driving direction step within the map view.

4. The method of claim 3, wherein step (a) comprises displaying the first visual indicator and second visual indicator, and wherein step (c) comprises displaying the panoramic image when at least one of the first visual indicator and second visual indicator is selected.

5. The method of claim 1, wherein step (c) comprises:
   orienting the panoramic image such that the panoramic image shows the geographic area from a viewpoint of the driver performing the driving action.

6. The method of claim 1, further comprising:
   displaying a driving direction overlay associated with the driving direction step on the panoramic image.

7. The method of claim 1, wherein simulating the driving action comprises:
   changing an orientation of the panoramic image when no panoramic image is available for a directly adjacent geographic area in the direction of the first navigation control; and
   displaying a panoramic image of the directly adjacent geographic area when a panoramic image is available for the directly adjacent geographic area.

8. The method of claim 1, wherein step (c) comprises displaying the panoramic image within a panoramic image bubble associated with the driving direction step.

9. The method of claim 8, wherein step (c) further comprises displaying one or more of:
(i) a driving direction text description that describes the driving action associated with the driving direction step;
(ii) a previous driving direction link;
(iii) a next driving direction link;
(iv) a driving direction step number that indicates an order of the driving direction within the plurality of driving direction steps;
(v) a zoom in link;
(vi) a help link; and
(vii) a full-screen mode link.

10. The method of claim 9, further comprising:
displaying a panoramic image associated with a previous driving direction step when the previous driving direction link is selected;
displaying a panoramic image associated with a next driving direction step when the next driving direction link is selected;
displaying a zoomed in view of the map view when the zoom in link is selected; and
displaying the panoramic image as a full-screen image when the full-screen mode link is selected.

11. The method of claim 9, wherein step (c) comprises displaying the previous driving direction link and next driving direction link, the method further comprising:
displaying the previous driving direction link and the next driving direction link as disabled when no panoramic image is available for the previous driving direction step and the next driving direction step, respectively.

12. The method of claim 1, wherein the method is performed within any one of:
(i) a mobile handset;
(ii) a portable navigation device;
(iii) an in-car navigation device.

13. A system for displaying panoramic images within driving directions, comprising:
a processor;
a driving directions module that displays a plurality of driving direction steps that form a driving directions path between a start address and a destination address and that receives user input selecting a driving direction step of the plurality of driving direction steps; and
a panorama viewer that displays a panoramic image of a geographic area where a driving action associated with the selected driving direction step would be performed by a driver,
wherein the panorama viewer further displays a first panoramic navigation control on the panoramic image, wherein the first panoramic navigation control illustrates the driving action associated with the selected driving direction step, and simulates the driving action when the first panoramic navigation control is selected, and
wherein the panorama viewer renders one or more segments of a polyline representative of the driving directions path on the panoramic image when the panoramic image is sufficiently proximate to the driving directions path;
one or more first modules that:
determine the location of the panoramic image;
determine a distance from the location of the panoramic image to a nearest vertex of the polyline;
determine a distance from the location of the panoramic image to a nearest segment of the polyline;
associate the panoramic image with the nearest vertex when the panoramic image is sufficiently close to the nearest vertex based on a specified distance;
associate the panoramic image with the nearest segment of the polyline when the panoramic image is not sufficiently proximate to the nearest vertex but is sufficiently close to the nearest segment based on the specified distance; wherein
when the panoramic image is sufficiently proximate to the driving directions path, determine the one or more segments of the polyline to render on the panoramic image; and
a second module that:
selects a first segment and a second segment of the polyline, immediately adjacent to the nearest vertex to render on the panoramic image, when the panoramic image is associated with the nearest vertex of the polyline; and
selects a third segment and a fourth segment of the polyline both parallel to the nearest segment of the polyline to render on the panoramic image, when the panoramic image is associated with the nearest segment.

14. The system of claim 13, wherein the driving directions module further displays at least one of:
a step-by-step list of the plurality of driving direction steps within a driving directions panel;
a first visual indicator in association with the driving direction step in the driving directions panel, the first visual indicator indicating that a panoramic image is available for the driving direction step;
a graphical illustration of the plurality of driving direction steps on a road map that encompasses the plurality of driving direction steps within a map view; and
a second visual indicator in association with the driving direction step within the map view.

15. The system of claim 14, wherein the driving directions module displays the first visual indicator and second visual indicator, and wherein the panorama viewer displays the panoramic image when at least one of the first visual indicator and second visual indicator is selected.

16. The system of claim 13, wherein the panorama viewer orients the panoramic image such that the panoramic image shows the geographic area from a similar viewpoint as that of the driver performing the driving action.

17. The system of claim 13, wherein the panorama viewer displays a driving direction overlay associated with the selected driving direction step on the panoramic image.

18. The system of claim 13, wherein the panorama viewer simulates the driving action by changing an orientation of the panoramic image when no panoramic image is available for a directly adjacent geographic area in the direction of the first navigation control; and
displaying a panoramic image of the directly adjacent geographic area when a panoramic image is available for the directly adjacent geographic area.

19. The system of claim 13, wherein the panorama viewer displays the panoramic image within a panoramic image bubble associated with the driving direction step.

20. The system of claim 19, wherein the panorama viewer further displays one or more of:
(i) a driving direction text description that describes the driving action associated with the selected driving direction step;
(ii) a previous driving direction link;
(iii) a next driving direction link;

(iv) a driving direction step number that indicates an order of the selected driving direction step within the plurality of driving direction steps;
(v) a zoom in link;
(vi) a help link; and
(vii) a full-screen mode link.

21. The system of claim 20, wherein the panorama viewer further displays:
a panoramic image associated with a previous driving direction step when the previous driving direction link is selected;
a panoramic image associated with a next driving direction step when the next driving direction link is selected;
a zoomed in view of the map view when the zoom in link is selected; and
a full-screen image of the panoramic image when the full-screen mode link is selected.

22. The system of claim 20, wherein the panorama viewer displays the previous driving direction link and next driving direction link, and wherein the panorama viewer displays the previous driving direction link and the next driving direction link as disabled when no image is available for the previous driving direction step and the next driving direction step, respectively.

23. The system of claim 13, wherein the system is within any one of:
(i) a mobile handset;
(ii) a portable navigation device;
(iii) an in-car navigation device.

24. A computer program product comprising a non-transitory computer useable medium having computer program logic recorded thereon for enabling a processor to display panoramic images within driving directions, the computer program logic comprising:
first means for enabling a processor to display a plurality of driving direction steps that form a driving directions path between a start address and a destination address;
means for enabling a processor to receive user input selecting a driving direction step of the plurality of driving direction steps;
second means for enabling a processor to display a panoramic image of a geographic area where a driving action associated with the selected driving direction step would be performed by a driver,
means for enabling a processor to display a first navigation control on the panoramic image, wherein the first navigation control illustrates the driving action associated with the driving direction step;
means for enabling a processor to simulate the driving action when said first navigation control is selected; and
means for enabling a processor to render one or more segments of a polyline, which is representative of the driving directions path and which includes one or more segments and one or more vertices, on the panoramic image when the panoramic image is sufficiently proximate to the driving directions path, by:
determining that the panoramic image is sufficiently proximate to the driving directions path based on the polyline;
determining whether the sufficient proximity of the panoramic image to the driving directions path is based on a nearest vertex of the one or more vertices of the polyline, or on a nearest segment of the one or more segments of the polyline;
in a case where the sufficient proximity is based on the nearest vertex, rendering a first segment and a second segment of the polyline, adjacent to the nearest vertex, on the panoramic image; and
in a case where the sufficient proximity corresponds to the nearest segment, rendering a third segment and a fourth segment of the polyline, both parallel to the nearest segment, on the panoramic image.

25. The computer program product of claim 24, wherein the first means comprises means for enabling a processor to display the plurality of driving direction steps using one or more of a map view and a driving directions panel.

26. The computer program product of claim 25, wherein the first means further comprises at least one of:
means for enabling a processor to display a step-by-step list of the plurality of driving direction steps within the driving directions panel;
means for enabling a processor to display a first visual indicator in association with the driving direction step in the driving directions panel, the first visual indicator indicating that a panoramic image is available for the driving direction step;
means for enabling a processor to overlay a graphical illustration of the plurality of driving direction steps on a road map that encompasses the plurality of driving direction steps within the map view; and
means for enabling a processor to display a second visual indicator in association with the driving direction step within the map view.

27. The computer program product of claim 26, wherein the second means comprises means for enabling a processor to display the panoramic image when at least one of the first visual indicator and second visual indicator is selected.

28. The computer program product of claim 24, wherein the second means comprises:
means for enabling a processor to orient the panoramic image such that the panoramic image shows the geographic area from a viewpoint of the driver performing the driving action.

29. The computer program product of claim 24, further comprising:
means for enabling a processor to display a driving direction overlay associated with the driving direction step on the panoramic image.

30. The computer program product of claim 24, wherein the means for enabling a processor to simulate comprises:
means for enabling a processor to change an orientation of the panoramic image when no panoramic image is available for a directly adjacent geographic area in the direction of the first navigation control; and
means for enabling a processor to display a panoramic image of the directly adjacent geographic area when a panoramic image is available for the directly adjacent geographic area.

31. The computer program product of 24, wherein the second means comprises means for enabling a processor to display the panoramic image within a panoramic image bubble associated with the driving direction step.

32. The computer program product of claim 31, wherein the second means further comprises means for enabling a processor to display one or more of:
(i) a driving direction text description that describes the driving action associated with the driving direction step;
(ii) a previous driving direction link;
(iii) a next driving direction link;
(iv) a driving direction step number that indicates an order of the driving direction within the plurality of driving direction steps;
(v) a zoom in link;

(vi) a help link; and (vii) a full-screen mode link.

33. The computer program product of claim 32, further comprising:

means for enabling a processor to display a panoramic image associated with a previous driving direction step when the previous driving direction link is selected;

means for enabling a processor to display a panoramic image associated with a next driving direction step when the next driving direction link is selected;

means for enabling a processor to display a zoomed in view of the map view when the zoom in link is selected; and means for enabling a processor to display the panoramic image as a full-screen image when the full-screen mode link is selected.

34. The computer program product of claim 32, further comprising:

means for enabling a processor to display the previous driving direction link and the next driving direction link as disabled when no panoramic image is available for the previous driving direction step and the next driving direction step, respectively.

35. The computer program product of claim 24, wherein the computer program product is used within any one of:

(i) a mobile handset;

(ii) a portable navigation device;

(iii) an in-car navigation device.

36. The method of claim 1, further comprising:

(d) receiving the plurality of driving direction steps from a driving directions server;

(e) receiving a plurality of panoramic images selected according to the driving directions path from a panorama server; and (f) associating each of the plurality of panoramic images with one or more segments of the driving directions path.

37. The method of claim 36, wherein one or more of the segments of the driving directions path is associated with one or more of the driving direction steps.

38. The method of claim 36, wherein one or more of the segments of the driving directions path includes one or more of the driving direction steps.

39. The method of claim 36, wherein step (d) comprises receiving the plurality of driving direction steps from the driving directions server, encoded as a set of locations on a map.

40. The method of claim 39, wherein step (e) comprises receiving the plurality of panoramic images selected according to the set of locations from the panorama server.

41. The method of claim 1, wherein said the panoramic image is sufficiently proximate to the driving directions path when the panoramic image is within a specified distance from at least one of a vertex of the polyline and a segment of the polyline.

42. The method of claim 41, wherein a vertex of the polyline represents a driving direction step on the driving directions path represented by the polyline.

43. The method of claim 1, wherein the panoramic image is sufficiently proximate to the driving directions path, further comprising:

(e) determining if a next panoramic image from said panoramic image is sufficiently proximate to the driving directions path;

(f) when the next panoramic image is not sufficiently proximate to the driving directions path, rendering one or more segments of the polyline to indicate that the user has navigated off the driving directions path.

44. The system of claim 13, wherein the driving directions module receives the plurality of driving direction steps from a driving directions server; further comprising:

a third module that receives a plurality of panoramic images selected according to the driving directions path from a panorama server; and a fourth module that associates each of the plurality of panoramic images with one or more segments of the driving directions path.

45. The system of claim 44, wherein one or more of the segments of the driving directions path is associated with one or more of the driving direction steps.

46. The system of claim 44, wherein one or more of the segments of the driving directions path includes one or more of the driving direction steps.

47. The system of claim 44, wherein the driving directions module receives the plurality of driving direction steps from the driving directions server, encoded as a set of locations on a map.

48. The system of claim 47, wherein the third module receives v plurality of panoramic images selected according to the set of locations from the panorama server.

49. The system of claim 13, wherein the panoramic image is sufficiently proximate to the driving directions path when the panoramic image is within a specified distance from at least one of a vertex of the polyline and a segment of the polyline.

50. The system of claim 49, wherein a vertex of the polyline represents a driving direction step on the driving directions path represented by the polyline.

51. The system of claim 13, wherein the panoramic image is sufficiently proximate to the driving directions path, wherein the one or more first modules determine if a next panoramic image from the panoramic image is sufficiently proximate to the driving directions path; and when the next panoramic image is not sufficiently proximate to the driving directions path, the panorama viewer renders one or more segments of the polyline to indicate that the user has navigated off the driving directions path.

* * * * *